US007206083B2

(12) United States Patent
Shimada

(10) Patent No.: US 7,206,083 B2
(45) Date of Patent: Apr. 17, 2007

(54) IMAGE FORMING SYSTEM AND CONTROLLING METHOD THEREOF ENABLING DISCHARGE OF SINGLE OUTPUT BUNDLE, AND COMPUTER-READABLE STORAGE MEDIA STORING PROGRAMS FOR EXECUTING THE CONTROL METHOD

(75) Inventor: Bungo Shimada, Tokyo (JP)

(73) Assignee: Canon Kabushiki Kaisha (JP)

( * ) Notice: Subject to any disclaimer, the term of this patent is extended or adjusted under 35 U.S.C. 154(b) by 817 days.

(21) Appl. No.: 10/079,148

(22) Filed: Feb. 19, 2002

(65) Prior Publication Data

US 2002/0126309 A1 Sep. 12, 2002

(30) Foreign Application Priority Data

Feb. 19, 2001 (JP) ............................ 2001-042218

(51) Int. Cl.
*G06F 15/177* (2006.01)

(52) U.S. Cl. .................... 358/1.14; 358/1.12; 358/1.15

(58) Field of Classification Search ................ 358/1.12
See application file for complete search history.

(56) References Cited

U.S. PATENT DOCUMENTS 4,626,156 A * 12/1986 Baughman et al. ........... 412/33
5,182,796 A * 1/1993 Shibayama et al. ......... 715/841
6,035,156 A * 3/2000 Okamoto et al. ............. 399/82
6,049,391 A * 4/2000 Farrell ....................... 358/1.15
6,539,181 B2 * 3/2003 Hull ............................ 399/19
2001/0021036 A1 * 9/2001 Nimura et al. ............ 358/1.12

FOREIGN PATENT DOCUMENTS

EP 1000761 A1 5/2000
JP 4-257872 A 9/1992
JP 7-319343 A 12/1995
JP 11-34436 A 2/1999
JP 11-212406 A 8/1999
JP 2001-31291 A 2/2001
JP 2001-72318 A 3/2001

* cited by examiner

*Primary Examiner*—Mark Zimmerman
*Assistant Examiner*—Jacob P. Rohwer
(74) *Attorney, Agent, or Firm*—Rossi, Kimms & McDowell LLP

(57) ABSTRACT

An image forming system is provided, which, if a jam occurs, enables the next fed sheet to be properly fed correctly. The image forming system can use an inserter. To allow an interrupted job to be properly processed, whether or not a recovery operation is to be carried out for the interrupted job is determined based on whether or not the interrupted job uses the inserter.

18 Claims, 20 Drawing Sheets

*FIG. 21*

| | | | | |
|---|---|---|---|---|
| JOB1 (1100-1) | 1101-1 | TEXT | AUTOMATIC SHEET FEEDING | 1105-1 |
| | 1102-1 | COVER SHEET | INSERTER | 1106-1 |
| | 1103-1 | BACK COVER SHEET | CASSETTE 1 | 1107-1 |
| | 1104-1 | INTERLEAVED SHEET | NONE | 1108-1 |
| | | ..... | ..... | |
| JOB2 (1100-2) | 1101-2 | TEXT | CASSETTE 1 | 1105-2 |
| | 1102-2 | COVER SHEET | INSERTER | 1106-2 |
| | 1103-2 | BACK COVER SHEET | INSERTER | 1107-2 |
| | 1104-2 | INTERLEAVED SHEET | CASSETTE 2 | 1108-2 |
| | | ........ | ........ | |
| JOBN (1100-n) | 1101-n | TEXT | CASSETTE 1 | 1105-n |
| | 1102-n | COVER SHEET | NONE | 1106-n |
| | 1103-n | BACK COVER SHEET | NONE | 1107-n |
| | 1104-n | INTERLEAVED SHEET | NONE | 1108-n |

IMAGE FORMING SYSTEM AND CONTROLLING METHOD THEREOF ENABLING DISCHARGE OF SINGLE OUTPUT BUNDLE, AND COMPUTER-READABLE STORAGE MEDIA STORING PROGRAMS FOR EXECUTING THE CONTROL METHOD

BACKGROUND OF THE INVENTION

1. Field of the Invention

This invention relates to an image forming system, a control method therefor, an image forming apparatus, a control method therefor, and storage media storing programs for executing these control methods.

2. Description of the Related Art

In conventional image forming systems such as copiers and printers, an inserter feeds only cover sheets.

If the inserter is adapted to feed not only cover sheets but also interleaved sheets and back cover sheets, this single inserter (sheet feeding stage) will have a plurality of different types of sheets (cover sheets, interleaved sheets, and back cover sheets) placed thereon. Thus, when a job that has been interrupted due to a jam or the like is recovered and then a sheet feeding operation is resumed, there is a possibility that the next fed sheet is not fed correctly.

SUMMARY OF THE INVENTION

It is an object of the present invention to provide an image forming system, a control method therefor, an image forming apparatus, and a control method therefor, which, if a jam occurs, enable the next fed sheet to be properly fed, as well as storage media storing programs for executing these control methods.

To attain the above object, a first aspect of the present invention provides an image forming system comprising an image forming apparatus including separate sheet setting means for setting at least one type of separate sheets to or between printing sheets on which images have been formed, and an image controller that controls the image forming apparatus, the image controller comprising separate sheet detecting means for detecting a type of the separate sheets set by the separate sheet setting means, jam display means for detecting a jam and providing display of information related to the jam that has occurred, and display changing means for changing the display provided by the jam display means based on a number of type of the separate sheets detected by the separate sheet detecting means.

Specifically, if the type of the separate sheets detected by the separate sheet detecting means is a plurality of types, the display changing means adds a display that instructs checking a state of the separate sheets.

To attain the above object, the first aspect of the present invention also provides a method of controlling an image forming system comprising an image forming apparatus including separate sheet setting means for setting at least one type of separate sheets to or between printing sheets on which images have been formed, and an image controller that controls the image forming apparatus via a network, the method being executed by the image controller and comprising the steps of detecting a type of the separate sheets set by the separate sheet setting means, detecting a jam and providing display of information related to the jam that has occurred, and changing the display provided in the display providing step based on a number of type of the separate sheets detected by the separate sheet detecting step.

To attain the above object, the first aspect of the present invention further provides a readable storage medium storing a program for executing a method of controlling an image forming system comprising an image forming apparatus including separate sheet setting means for setting at least one type of separate sheets to or between printing sheets on which images have been formed, and an image controller that controls the image forming apparatus, the method being executed by the image controller, the program comprising a module for detecting a type of the separate sheets set by the separate sheet setting means, a module for detecting a jam and providing display of information related to the jam that has occurred, and a module for changing the display provided by the display providing module based on a number of type of the separate sheets detected by the separate sheet detecting module.

To attain the above object, the first aspect of the present invention further provides an image forming apparatus including separate sheet setting means for setting at least one type of separate sheets to or between printing sheets on which images have been formed, comprising separate sheet detecting means for detecting a type of the separate sheets set by the separate sheet setting means, jam display means for detecting a jam and providing display of information related to the jam that has occurred, and display changing means for changing the display provided by the jam display means based on a number of type of the separate sheets detected by the separate sheet detecting means.

To attain the above object, the first aspect of the present invention further provides a method of controlling an image forming apparatus including separate sheet setting means for setting at least one type of separate sheets to or between printing sheets on which images have been formed, comprising the steps of detecting a type of the separate sheets set by the separate sheet setting means, detecting a jam and providing display of information related to the jam that has occurred, and changing the display provided in the display providing step based on a number of type of the separate sheets detected by the separate sheet detecting step.

To attain the above object, the first aspect of the present invention also provides a readable storage medium storing a program for executing a method of controlling an image forming apparatus including separate sheet setting means for setting at least one type of separate sheets to or between printing sheets on which images have been formed, the program comprising a module for detecting a type of the separate sheets set by the separate sheet setting means, a module for detecting a jam and providing display of information related to the jam that has occurred, and a module for changing the display provided by the display providing module based on a number of type of the separate sheets detected by the separate sheet detecting module.

According to the first aspect of the present invention, if a jam occurs, information related to the jam that has occurred is displayed. This display is changed depending on the number of type of separate sheets detected. Therefore, the user can take necessary measures depending upon the number of type of separate sheets set to or between printing sheets on which images have been formed. As a result, sheets to be fed can be properly fed.

To attain the above object, a second aspect of the present invention further provides an image forming system including an image forming apparatus having image forming means for forming images on sheets based on an input job, the image forming apparatus being connectable to a sheet processing apparatus having an inserter for inserting a sheet different from sheets from the image forming means, into the sheets from the image forming means, the image forming system comprising control means for controlling a recovery operation for the job in a case where the job is interrupted, wherein the control means determines whether or not the recovery operation for recovering the interrupted job is to be executed, based on whether or not the interrupted job uses the inserter.

Preferably, the control means inhibits the recovery operation from being automatically carried out for the interrupted job if the job uses the inserter, and permits the recovery operation to be automatically carried out for the interrupted job if the job does not use the inserter.

More preferably, the control means executes a first mode in which the recovery operation is started in response to an instruction from a user if the interrupted job uses the inserter, and executes a second mode in which the recovery operation is started without any instruction from the user if the interrupted job does not use the inserter.

Specifically, in the first mode, a notification is given to the user to urge the user to check the inserter, and in the second mode, the recovery operation is carried out without any notification being given to the user to urge the user to check the inserter.

Preferably, the control means permits the recovery operation to be automatically carried out for the interrupted job on condition that a number of sheets from the inserter is smaller than a predetermined number, if the job uses the inserter.

More preferably, the control means inhibits the recovery operation from being automatically carried out for the interrupted job on condition that the number of sheets from the inserter is not smaller than the predetermined number, if the job uses the inserter.

Preferably, the control means controls notifications to be given to the user, in a manner such that the control means gives a first notification to the user to urge the user to check the inserter if the interrupted job uses the inserter, and gives a second notification different from the first notification to the user if the interrupted job does not use the inserter.

In a typical case, the control means interrupts the job in response to occurrence of a sheet jam in the image forming apparatus.

Alternatively, the control means interrupts the job in response to occurrence of a sheet jam in the sheet processing apparatus.

Alternatively, the image forming apparatus processes a job input by an original reading device.

In this case, the control means interrupts the job in response to occurrence of a sheet jam in the original reading device.

Further, the image forming apparatus processes a job input by an external apparatus.

To attain the above object, the second aspect of the present invention also provides a method of controlling an image forming system including an image forming apparatus having image forming means for forming images on sheets based on an input job, the image forming apparatus being connectable to a sheet processing apparatus having an inserter for inserting a sheet different from sheets from the image forming means, into the sheets from the image forming means, the method comprising the step of controlling a recovery operation carried out for the job in a case where the job is interrupted, and wherein the controlling step determines whether or not the recovery operation for recovering the interrupted job is to be executed, based on whether or not the interrupted job uses the inserter.

To attain the above object, the second aspect of the present invention further provides a computer-readable storage medium storing a program for causing an image forming system to execute a step, the image forming system including an image forming apparatus having image forming means for forming images on sheets based on an input job, the image forming apparatus being connectable to a sheet processing apparatus having an inserter for inserting a sheet different from sheets from the image forming means, into the sheets from the image forming means, the step comprising controlling a recovery operation carried out for the job in a case where the job is interrupted, and wherein the controlling step determines whether or not the recovery operation for recovering the interrupted job is to be executed, based on whether or not the interrupted job uses the inserter.

According to the second aspect of the present invention, whether or not a recovery operation is to be carried out for an interrupted job is determined based on whether or not the interrupted job uses an inserter. As a result, this can allow an interrupted job to be properly processed.

The above and other objects, features, and advantages of the present invention will be more apparent from the following detailed description taken in conjunction with the accompanying drawings.

BRIEF DESCRIPTION OF THE DRAWINGS

FIG. 21 is a view illustrating a sheet-feeding managing table; and

DETAILED DESCRIPTION OF THE PREFERRED EMBODIMENTS

The present invention will now be described below with reference to the drawings showing a preferred embodiment thereof.

Figure 1:
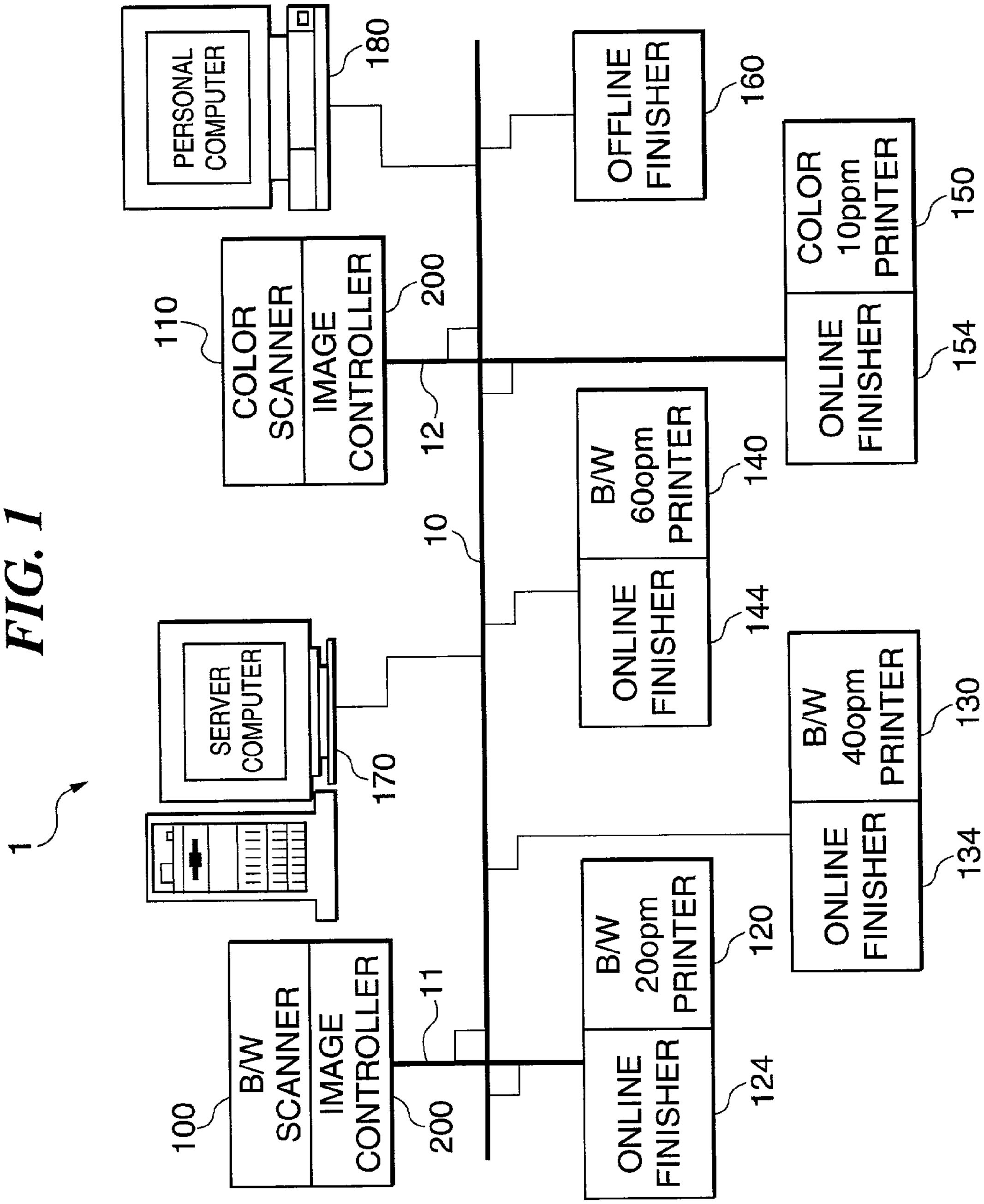
FIG. 1 is a block diagram showing the construction of an image forming system according to an embodiment of the present invention.

FIG. 1 is a block diagram showing an image forming system according to an embodiment of the present invention.

In FIG. 1, the image forming system 1 is comprised of a B/W (black-and-white) scanner 100 that can read black-and-white originals and a color scanner 110 that can read color originals, both scanners being provided as image input apparatuses, a low-speed black-and-white printer (B/W 20 opm printer) 120, a medium-speed black-and-white printer (B/W 40 opm printer) 130, and a high-speed black-and-white printer (B/W 60 opm printer) 140, and a color printer (color 10 ppm printer) 150, all provided as image output apparatuses (image forming apparatuses), an offline finisher 160 that can post-process printing sheets off-line, a server computer 170 having a mass storage, and a personal computer 180 for a personal user, all these components being connected to a LAN (Local Area Network) 10 such as an Ethernet. In this image forming system 1, the B/W scanner 100 and the B/W 20 opm printer 120 are connected together via a local video bus 11 dedicated to black-and-white image formation. Further, the color scanner 110 and the color printer 150 are connected together via a local video bus 12 dedicated to color image formation. In this embodiment, the B/W scanner 100, an image controller 200, the B/W printer 120 (or 140), and an online finisher 124 (or 134) may be integrated together or separated from one another so as to function as an image forming apparatus such as a black-and-white copier. Likewise, the color scanner 110, the image controller 200, the color printer 150, and an online finisher 154 may be integrated together or separated from one another so as to function as an image forming apparatus such as a color copier.

The B/W scanner 100 and the color scanner 110 each have the image controller 200 connected thereto via an exclusive local bus, not shown, for controlling image reading and image transfer.

The B/W 20 opm printer 120, B/W 40 opm printer 130, B/W 60 opm printer 140, and color printer 150 have respective online finishers 124, 134, 144, and 154, connected thereto for giving online instructions for printed printing sheets to be post-processed.

Figure 2:
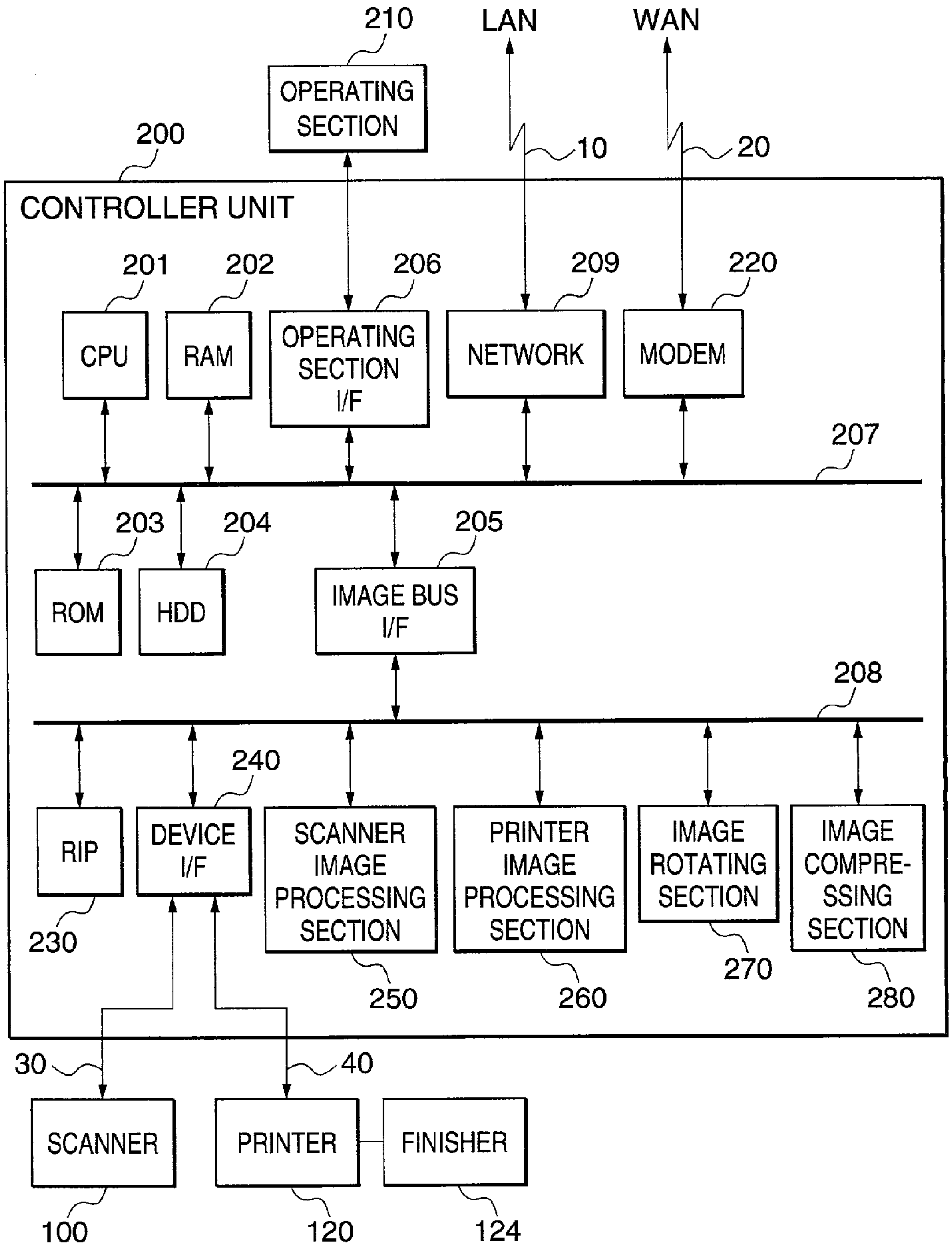
FIG. 2 is a block diagram showing the construction of an image forming apparatus 200 appearing in FIG. 1.

FIG. 2 is a block diagram showing the construction of the image controller 200 in FIG. 1.

In FIG. 2, the image controller 200 inputs and outputs image and device information. The image controller 200 is connected to the B/W scanner 100 and B/W 20 opm printer 120 to carry out overall control of various units such as the scanner 100 and the printer 120 including the finisher 124 and execute various processes including one shown in a flow chart of FIG. 20, described later. The image controller 200 is also connected to the LAN 10 and a public telephone line (WAN) 20. Thus, the image controller 200 can also process data (including image and device information) from external apparatuses, which are input via the LAN 10, the WAN 20, or the like.

A CPU 201 is a controller that controls the entire system. A RAM 202 is a system work memory for operation of the CPU 201 and which is also used as an image memory temporarily storing image data. A ROM 203 is a boot ROM that stores a system boot program (including programs that execute various processes including the one shown in the flow chart of FIG. 20, described later). An HDD (Hard Disk Drive) 204 stores system software and image data. Further, the HDD 204 saves information on nodes connected to the network (LAN 10), such as image output speeds and installation positions of the nodes.

An operating section interface (I/F) 206 is an interface section connected to an operating section (user interface) 210 to output image data thereto. Based on the image data, images are displayed on the operating section 210. Information input via the operating section 210 by a user of this system is transmitted to the CPU 201 via the operating section interface 206.

A network 209 is connected to the LAN 10 to input and output information. A modem 220 is connected to the public telephone line 20 to input and output information via the line 20. These devices are arranged on a system bus 207.

An image bus interface (I/F) 205 is a bus bridge that connects an image bus 208 which transfer image data at high speed and the system bus 207 together, to convert data structures. The image bus 208 is comprised of a high-speed bus such as a PIC bus.

Various devices, described below, are arranged on the image bus 208. A raster image processor (RIP) 230 expands a PDL code into a bit map image. A device interface (I/F) 240 connects the image controller 200, B/W scanner 100, and B/W 20 opm printer 120 together to carry out synchronous/asynchronous conversion of image data. A scanner image processing section 250 corrects, processes, and edits input image data. A printer image processing section 260 corrects the printer or carries out resolution conversion or other processes so as to provide good print output image data. An image rotating section 270 rotates image data. An image compressing section 280 carries out compression of multi-valued image data into JPEG data and decompression thereof and compression of binary data into JBIG, MMR, or MH data and decompression thereof.

Figure 3:
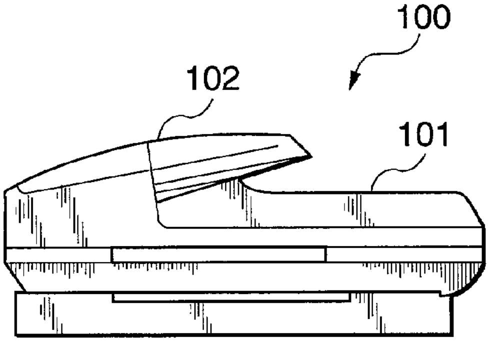
FIG. 3 is a side view schematically showing a B/W scanner 100 appearing in FIG. 1.

FIG. 3 is a side view schematically showing the W/B scanner 100 in FIG. 2.

The B/W scanner 200 is provided with an original feeder 101 that feeds originals to be read. The original feeder 101 has a tray 102 on which originals to be fed are set. The B/W scanner 100 reads image information from originals with images drawn thereon by scanning them using a CCD line sensor, not shown, while irradiating them with light, and then converts the read image information into an electric signal as raster image data 30. When the user operates the operating section 210 (see FIG. 2) to give an instruction for reading the originals, the CPU 201 of the image controller 200 transmits this instruction to the scanner 100. Upon receiving the instruction, the scanner 100 reads the images on the originals by feeding them sheet by sheet using the original feeder 101.

Figure 4A:
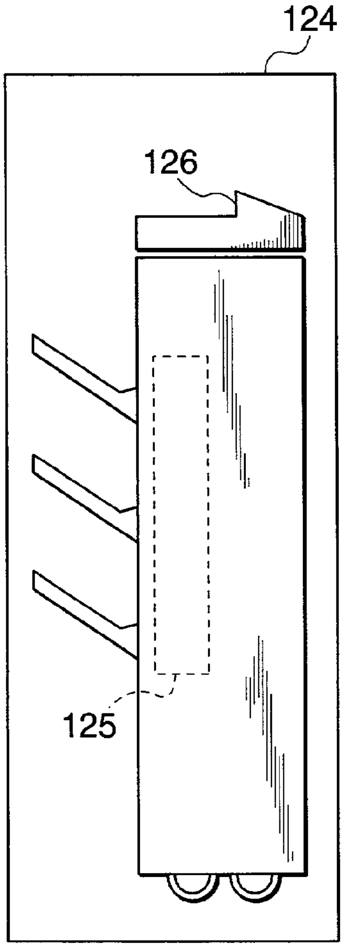
FIG. 4A is a side view schematically showing a low-speed black-and-white printer 120 appearing in FIG. 2.
Figure 4B:
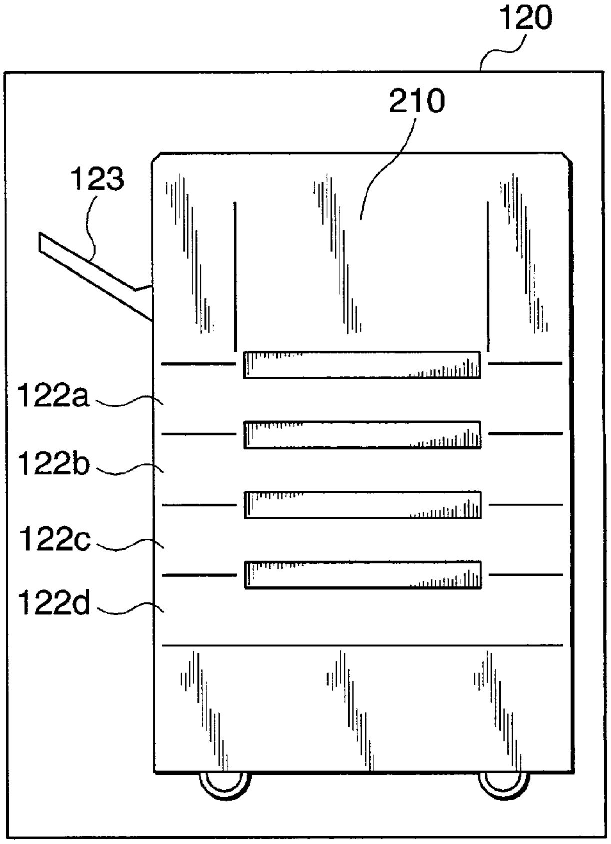
FIG. 4B is a side view schematically showing another example of low-speed black-and-white printer 120 appearing in FIG. 2.

FIGS. 4A and 4B are side views schematically showing examples of the W/B 20 opm printer in FIG. 2.

The W/B 20 opm printer 120 forms raster image data 40 (see FIG. 2) on printing sheets as images. The method of forming images includes an electrophotographic method using a photosensitive drum and a photosensitive belt (neither of them is shown), and an ink jet method of printing images directly on printing sheets by ejecting ink through a fine-jet nozzle array.

A print operation is started in response to an instruction (raster image data 40) from the CPU 201. The B/W 20 opm printer 120 has installed therein a plurality of sheet feeding stages in a manner allowing the user to select the size and direction of printing sheets, and a plurality of corresponding sheet feeding cassettes 122*a*, 122*b*, 122*c*, and 122*d* (see FIG. 4B). Further, a sheet discharging tray 123 receives printing sheets that have been printed. If the B/W 20 opm printer 120 has the finisher 124 installed therein as shown in FIG. 4A, printed printing sheets are conveyed to the finisher 124. The finisher 124 has a stapler unit 125 (postprocess unit) installed therein. The stapler unit 125 can staple each set of 50 or 100 printing sheets.

The finisher 124 has an inserter unit 126 installed therein and having an insert tray (not shown). The inserter unit 126 can be used as one sheet feeding stage like the sheet feeding cassette 122*a*, 122*b*, 122*c*, or 122*d*. Since the inserter unit 126 is installed in the finisher 124, sheets (for example, cover sheets, interleaved sheets, or back cover sheets) fed from the inserter unit 126 via an insert tray thereof can be fed into the finisher 124 without passing through an image forming section or a fixing unit (neither of them is shown) in the B/W 20 opm printer 120. Accordingly, sheets from the inserter unit cannot be printed (no images can be printed thereon) but can be inserted between printed printing sheets from the B/W 20 opm printer 120 without being affected by heat generated by the printer 120. Further, by setting originals printed in colors, on the inserter unit 126, the finisher 124 can discharge (output) sheets printed in multiple colors so that the discharged printed sheets can be stapled book-bound in one bundle.

To print both sides of the printing sheet, the sheet is turned upside down in the W/B 20 opm printer 120 after one side thereof has been printed. Subsequently, the other side, which has not been printed yet, is printed in response to an instruction (raster image data 40) from the CPU 201.

Now, the device I/F 240 will be described.

Figure 5:
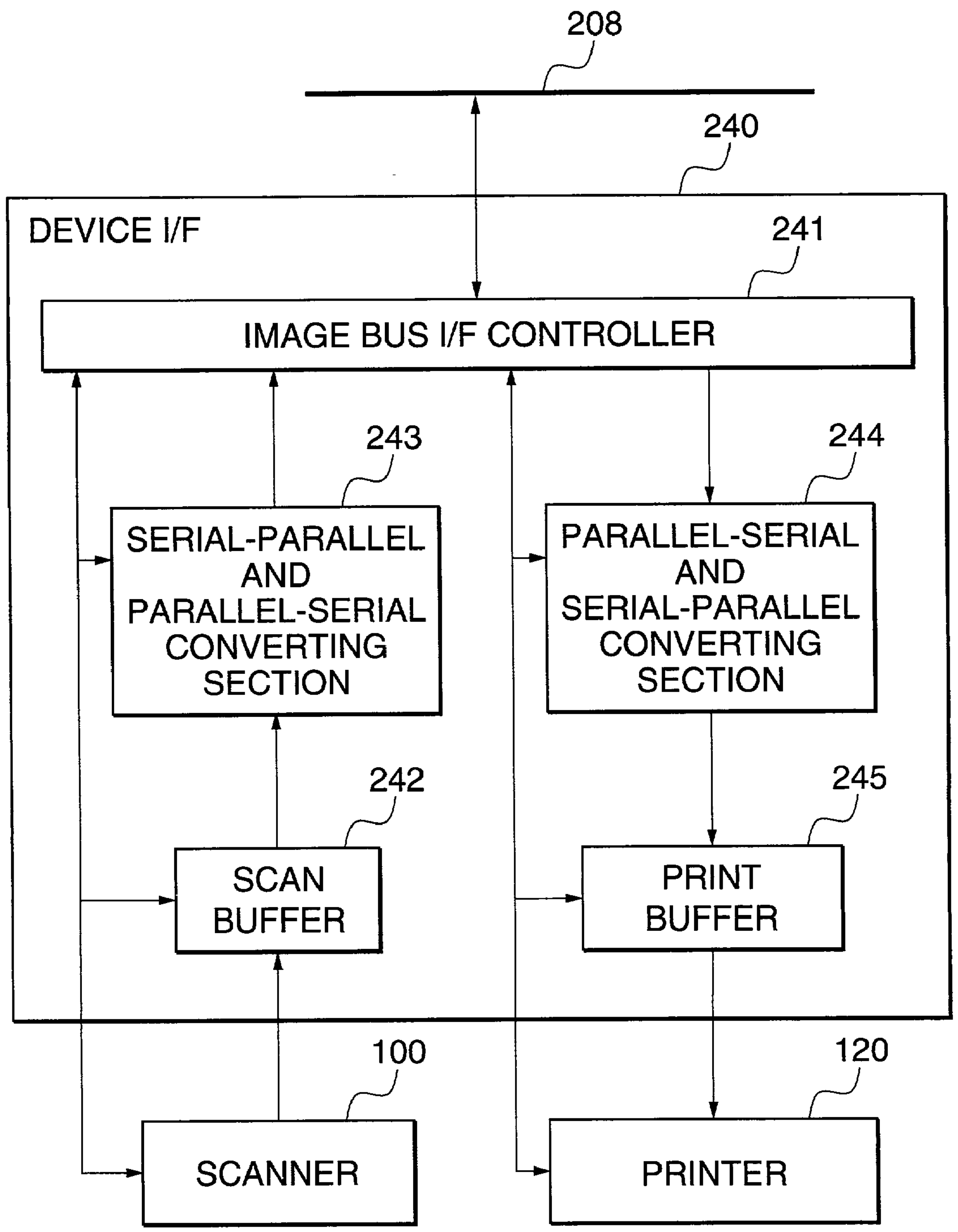
FIG. 5 is a block diagram showing the construction of a device interface (I/F) 240 appearing in FIG. 2.

FIG. 5 is a block diagram showing the construction of the device I/F 240 in FIG. 2.

In FIG. 5, an image bus I/F controller 241 installed in the device I/F 240 is connected to the image bus 208 to control a bus access sequence therefor. Further, the image bus I/F controller 241 controls devices in the device I/F 240, described below, and transmits control signals to the external scanner 100 and the B/W 20 opm printer 120.

A scan buffer 242 temporarily saves image data transmitted from the scanner 100, and outputs the saved image data to the image bus 208 in synchronization therewith. A serial-parallel and parallel-serial converting section 243 arranges the image data saved in the scan buffer 242, in an appropriate order, or decomposes the image data to convert it so as to have an appropriate data width for transfer to the image bus 208. A parallel-serial and serial-parallel converting section 244 decomposes image data transferred from the image bus 208 or arranges the image data in an appropriate order to convert it so as to have an appropriate data width for storage in the print buffer 245. The print buffer 245 temporarily saves the image data transferred from the image bus 208 and synchronously outputs the saved image data to the printer 120 in synchronization therewith.

Here, the details of image scan processing will be described. Image data transmitted from the scanner 100 is saved in the scan buffer 242 synchronously with a timing signal also transmitted from the scanner 100.

If the image bus 208 is a PIC bus, when 32 bits or more of image data is fed to and stored in the buffer 242, 32 bits of image data of the stored data is transmitted to the serial-parallel and parallel-serial converting section 243 in a first-in first-out manner. The 32-bit data converted by the serial-parallel and parallel-serial converting section 243 is transferred to the image bus 208 via the image bus I/F controller 241. On the other hand, if the image bus is of an IEEE 1394 type, the image data in the buffer 242 is transmitted from the buffer 242 to the serial-parallel and parallel-serial converting section 243 in a first-in first-out manner. The serial image data converted by the serial-parallel and parallel-serial converting section 243 is transferred to the image bus 208 via the image bus I/F controller 241.

Now, the details of processing for image printing will be described. If the image bus 208 is a PCI bus, 32-bit image data transmitted from the image bus 208 is received by the image bus I/F controller 241, which then transmits the data to the parallel-serial and serial-parallel converting section 244. The parallel-serial and serial-parallel converting section 244 decomposes the image data into an appropriate number of data bits to be input to the printer 120, and saves them in the print buffer 245. On the other hand, if the image bus 208 is of an IEEE 1394, serial image data transmitted from the image bus 208 is received by the image bus I/F controller 241, which then transmits the data to the parallel-serial and serial-parallel converting section 244. The parallel-serial and serial-parallel converting section 244 converts the image data into an appropriate number of data bits to be input to the printer 120, and saves them in the print buffer 245. The image data in the buffer 245 is transmitted to the printer 120 in a first-in first-out manner in synchronization with a timing signal transmitted from the printer 120.

Next, the scanner image processing section 250 will be described.

Figure 6:
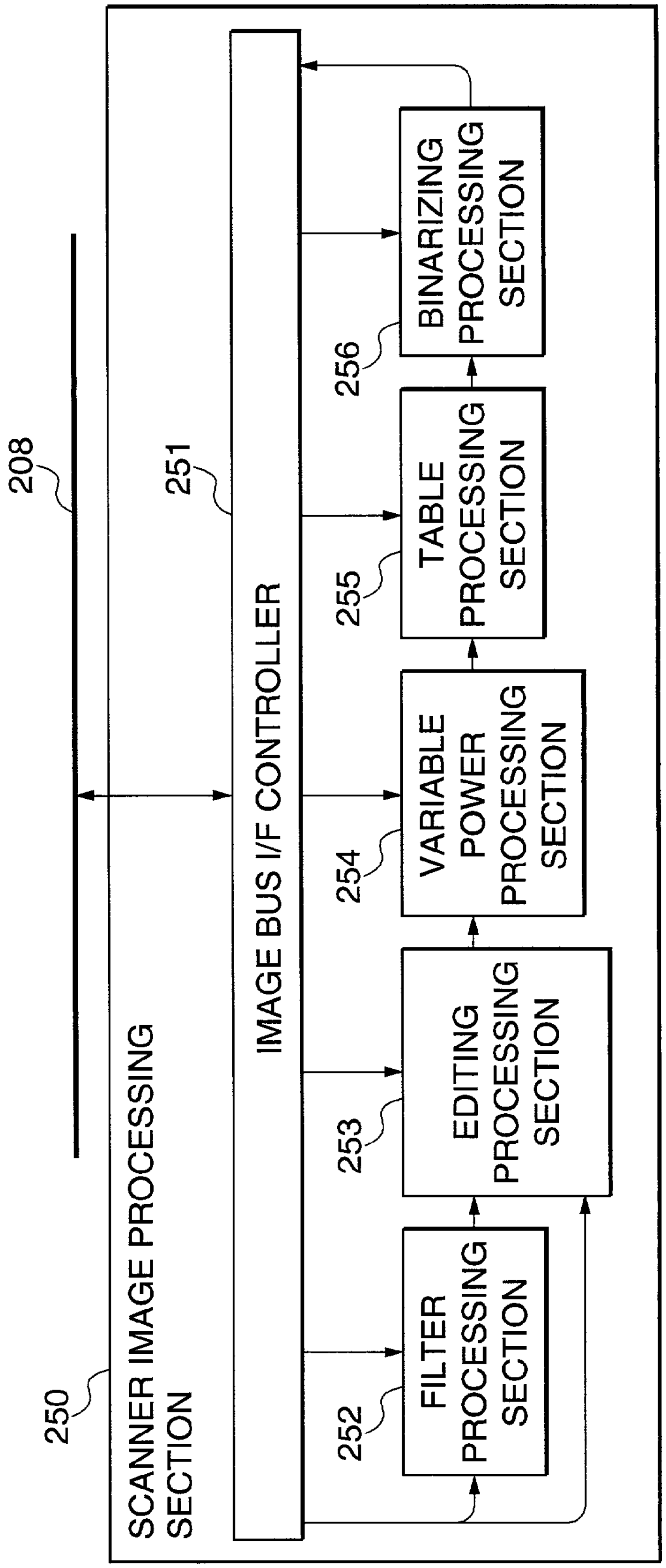
FIG. 6 is a block diagram showing the construction of a scanner image processing section appearing in FIG. 2.

FIG. 6 is a block diagram showing the construction of the scanner image processing section 250 in FIG. 2.

In FIG. 6, an image bus I/F controller 251 is connected to the image bus 208 to control a bus access sequence for the image bus 208. The image bus I/F controller 251 also controls the following devices constituting the scanner image processing section 250.

A filter processing section 252 is a space filter that carries out convolution operations. An editing processing section 253 recognizes, for example, a closed area in input image data which is marked with a marker by a marker pen and carries out various image processes such as shading, screening, and negative-positive reversal on the image data in the closed area. A variable power processing section 254 carries out an interpolating operation on a raster image in a main scanning direction to magnify or reduce the image if the resolution of the image to be read is to be changed. Scaling (magnification/reduction) in a sub-scanning direction is carried out by changing the scanning speed of an image reading line sensor (not shown). A table processing section 255 carries out table conversions by converting read brightness data as image data into density data. A binarizing processing section 256 binarizes multi-valued gray scale image data by an error diffusion process or a screen process. The image data subjected to these processes is transferred again to the image bus 208 via the image bus I/F controller 251.

Now, the printer image processing section 260 will be described.

Figure 7:
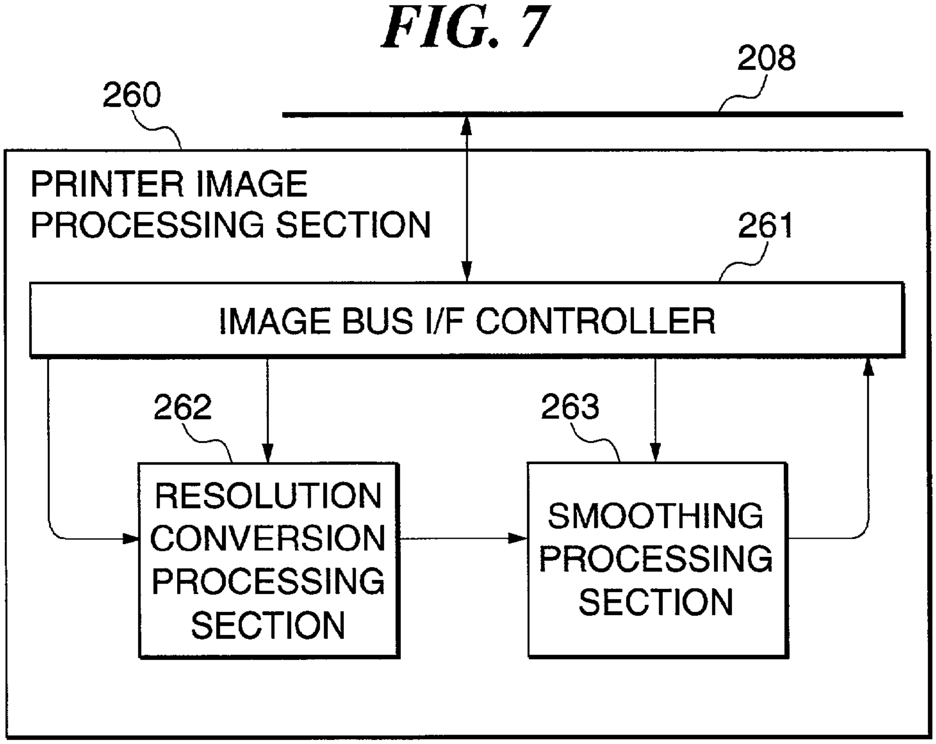
FIG. 7 is a block diagram showing the construction of a printer image processing section 260 appearing in FIG. 2.

FIG. 7 is a block diagram showing the construction of the printer image processing section in FIG. 2.

In FIG. 7, an image bus I/F controller 261 is connected to the image bus 208 to control a bus access sequence for the image bus 208. The image bus I/F controller 261 also controls devices constituting the printer image processing section 260. Among these devices, a resolution conversion processing section 262 converts image data received via the LAN 10 or the public telephone line 20 into data with an appropriate resolution for printing by the printer 120 (resolution conversion). A smoothing processing section 263 eliminates jaggies of the image data with its resolution converted. The term "jaggies" means oblique lines or curves which are jaggy rather than smooth.

Next, the image rotation processing section 270 will be described.

Figure 8:
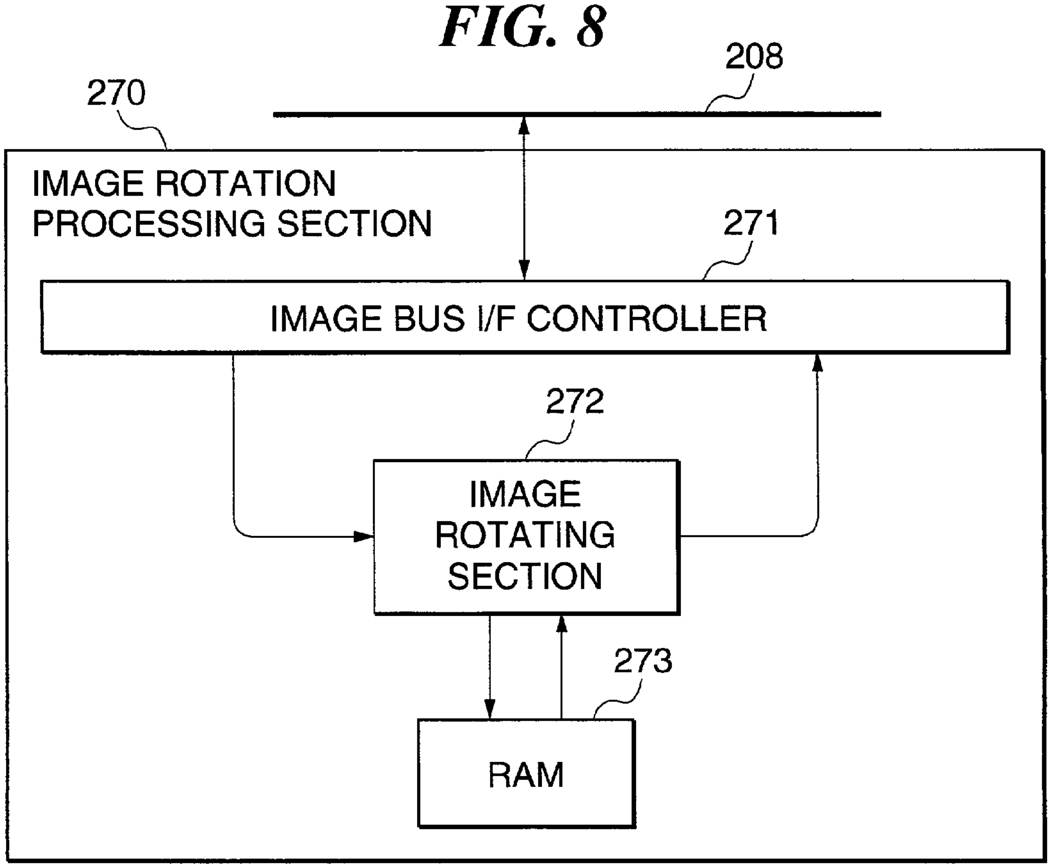
FIG. 8 is a block diagram showing the construction of an image rotation processing section 270 appearing in FIG. 2.

FIG. 8 is a block diagram showing the construction of the image rotation processing section 270 in FIG. 2.

In FIG. 8, an image bus I/F controller 271 is connected to the image bus 208 to control a bus sequence for the image bus 208. The image bus I/F controller 271 also sets modes for an image rotating section 272 and controls timing in which image data is transferred to the image rotating section 272. The details of processing carried out by the image processing section 272 will be described below.

When the CPU 201 (see FIG. 2) gives an instruction for settings for image rotation control to the image bus I/F controller 271, then based on this instruction, the image bus I/F controller 271 makes settings required for image rotation for the image rotating section 272. Items to be set include, for example, image size, rotating direction, and angle. After the settings have been made, the CPU 201 again permits the image bus I/F controller 271 to transfer image data. In accordance with this permission, the image bus I/F controller 271 starts transferring image data from the RAM 202 (see FIG. 2) or devices on the image bus 208. In this case, images to be rotated have a size of 32×32 bits, for example. Further, when image data is transferred to the image bus 208, 32 bits of image data are transferred at a time. Images handled in this case are assumed to have a binary format.

Figure 10A:
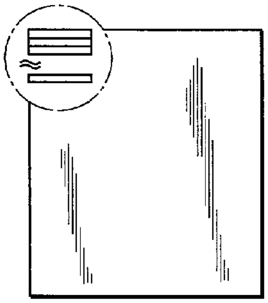
FIGS. 10A and 10B is a view useful in explaining image rotation.
Figure 10B:
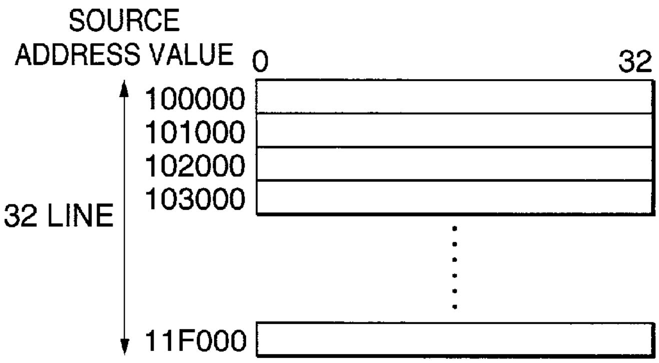

To obtain an image of size 32×32 bits as mentioned above, the above-mentioned number of bits of data transfer must be carried out 32 times, and image data from discontinuous addresses must be transferred (see FIGS. 10A and 10B).

Figure 11:
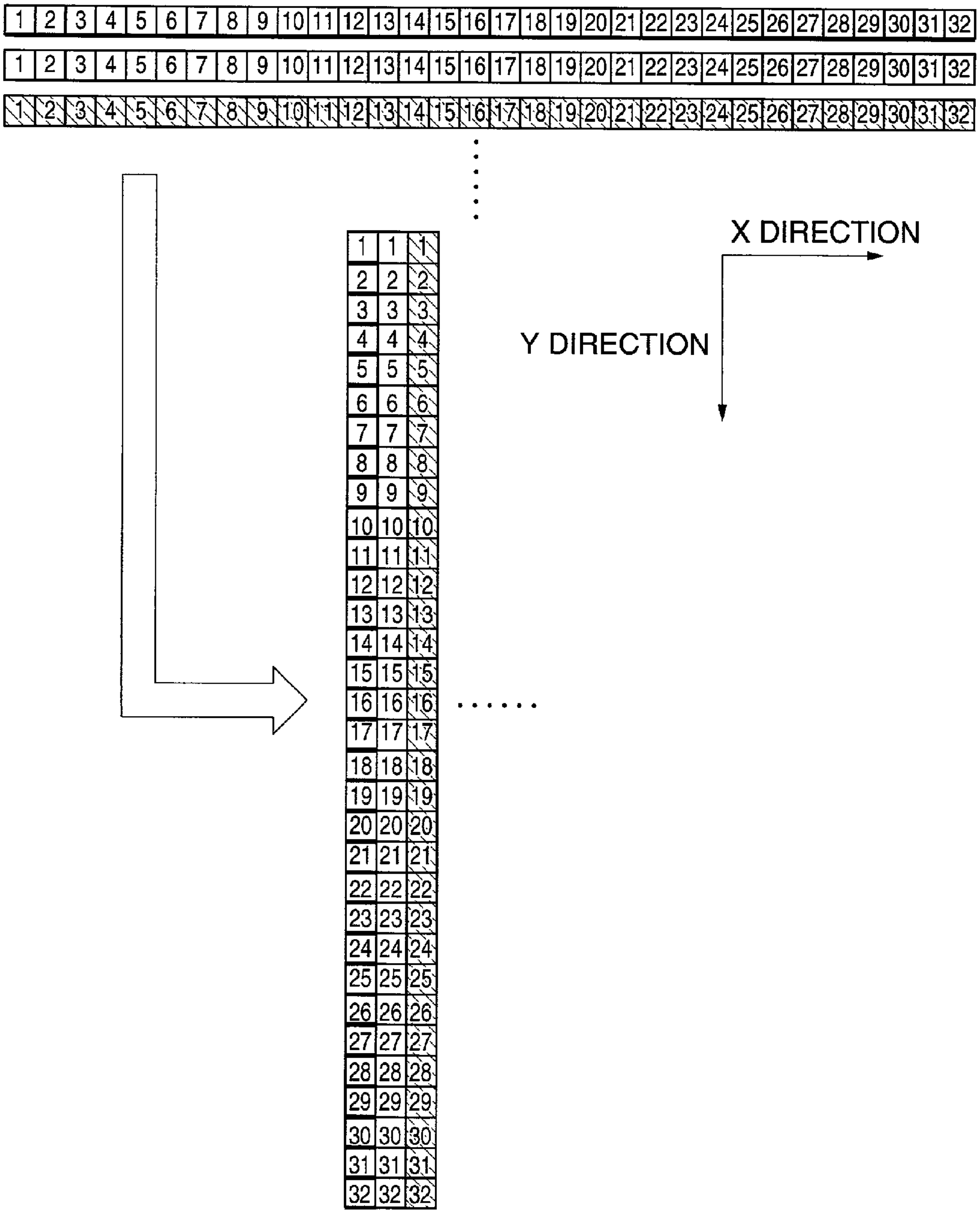
FIG. 11 is a view showing a manner of rotating an image.

The image data transferred by the discontinuous addressing is written to the RAM 273 so as to be rotated through a desired angle when read out. For example, for a counter-clockwise rotation through 90°, initially transferred 32-bit image data is written in a Y direction (see FIG. 11). By reading out the image data in an X direction, the image is rotated.

Once the 32×32 bit image data has been rotated (written to the RAM 273), the image rotating section 272 reads out the image data from the RAM 273 using the above described readout method and then transfers the image to the image bus I/F controller 271.

Upon receiving the rotated image data, the image bus I/F controller 271 transfers the data to the RAM 202 or devices on the image bus 208 by continuous addressing.

The above sequence of steps are repeated until the CPU 201 stops making a processing request when, for example, a required number of pages have been processed.

Now, the image compression processing section 280 will be described.

Figure 9:
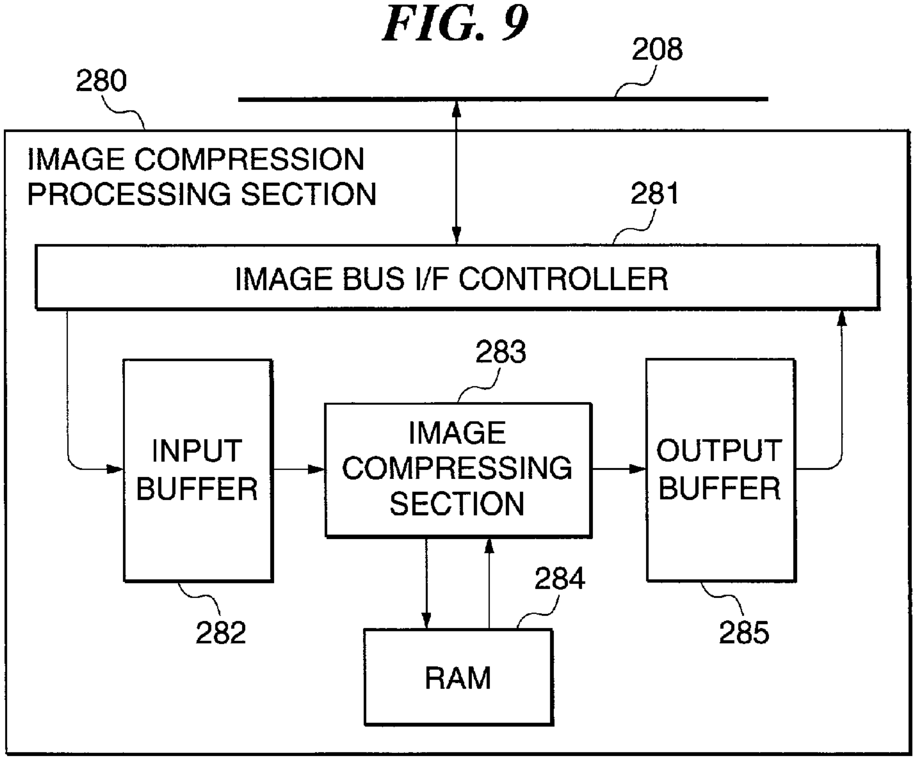
FIG. 9 is a block diagram showing the construction of an image compression processing section appearing in FIG. 2.

FIG. 9 is a block diagram showing the construction of the image compression processing section 280 in FIG. 2.

In FIG. 9, an image bus I/F controller 281 is connected to the image bus 208 to control a bus access sequence therefor. The image bus I/F controller 281 also controls timing of data exchange between an input buffer 282 and an output buffer 285 and mode settings for an image compressing section 283. The image compressing section 283 has a RAM 284 connected thereto. The details of processing carried out by the image compression processing section 280 thus constructed are as follows:

The CPU 201 gives an instruction for settings for image compression control to the image bus I/F controller 281. Then, based on the instruction, the image bus I/F controller 281 makes settings required for image compression for the image compressing section 283. The items to be set include, for example, MMR compression and JBIG decompression. After the settings have been made, the CPU 201 again permits the image bus I/F controller 281 to transfer image data. In accordance with this permission, the image bus I/F controller 281 starts transferring image data from the RAM 202 or devices on the image bus 208. The received image data is temporarily stored in the input buffer 282, and the image is transferred at a fixed speed in accordance with an image data request from the image compressing section 283. On this occasion, the input buffer 282 determines whether image data can be transferred between the image bus I/F controller 281 and the image compressing section 283. If it is impossible to load image data from the image bus 208 and to write images to the image compressing section 283, control is provided such that no data is transferred. Such control will be hereinafter referred to as handshaking.

The image compressing section 283 temporarily stores the received image data in the RAM 284. The reason why the image data is thus once stored in the RAM 284 is that data for several lines is required for image compression depending on the type of the image compressing process, so that image data for several lines must be stored before the compression of the first line is carried out.

Immediately upon completion of the image compression, the compressed image data is transmitted to the output buffer 285. The output buffer 285 carries out handshaking between the image bus controller 281 and the image compressing section 283 to transfer the image data to the image bus I/F controller 281.

The image bus I/F controller 281 transfers the transferred image data, which has been compressed (or decompressed), to the RAM 202 or devices on the image bus 208. The above sequence of steps are repeated until the CPU 201 stops issuing the processing request, for example, when a required number of pages have been processed or the image compressing section makes a stop request, for example, when an error occurs during compression or decompression.

In the image forming system constructed as described above, one or more images input from the scanner 100 or the network 209 are treated as a document or documents and can be stored in an image recording area called "a box". The image data and attribute data in the box are recorded in the HDD 204.

Figure 12:
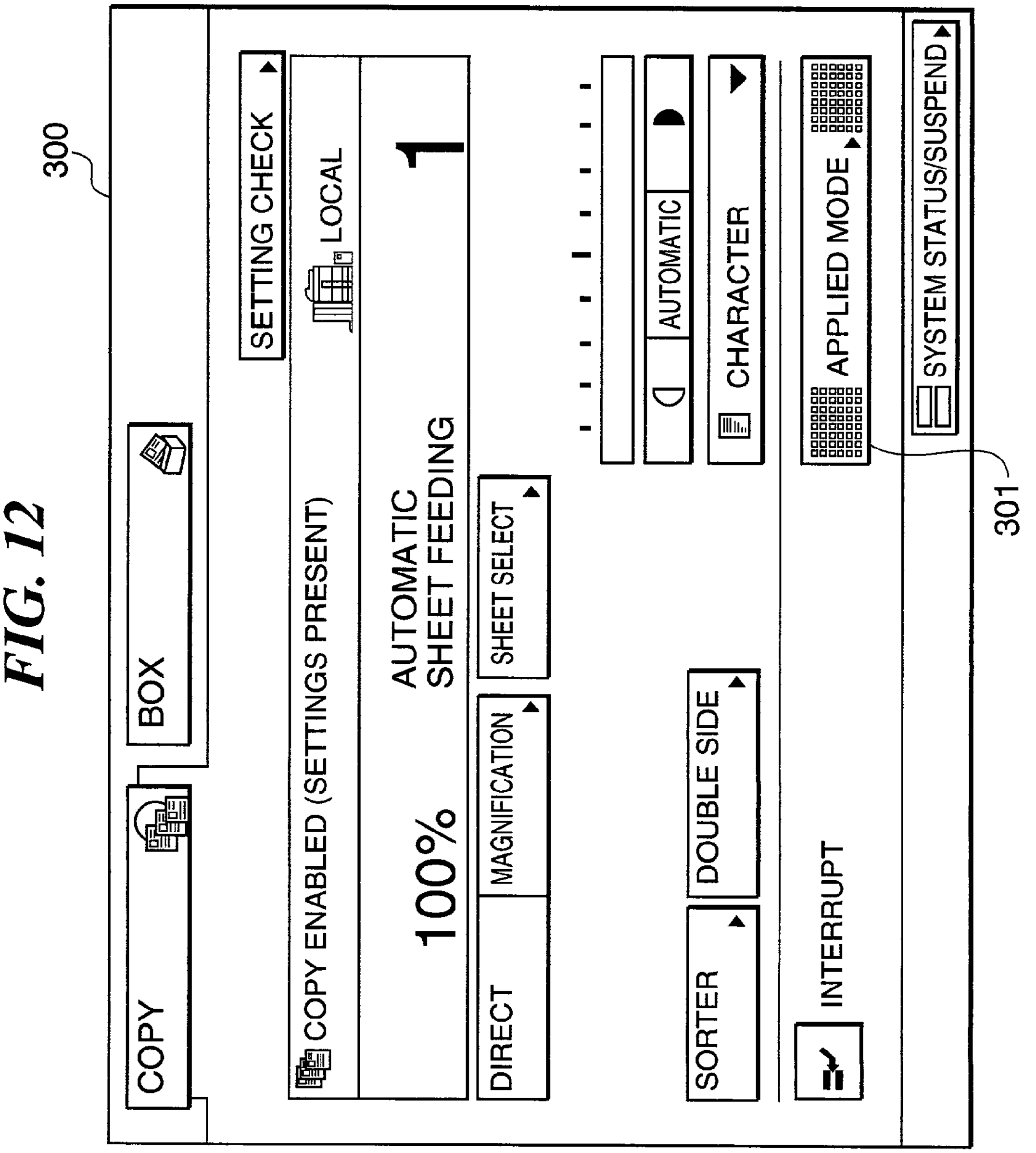
FIG. 12 is a view illustrating a copy basic screen displayed in an operating section 210 appearing in FIG. 2.

FIG. 12 is a view illustrating a copy basic screen displayed in the operating section 210 in FIG. 2.

The copy basic screen 300 displays an applied mode button 301 that is depressed to allow the user to use various copy functions.

Figure 13:
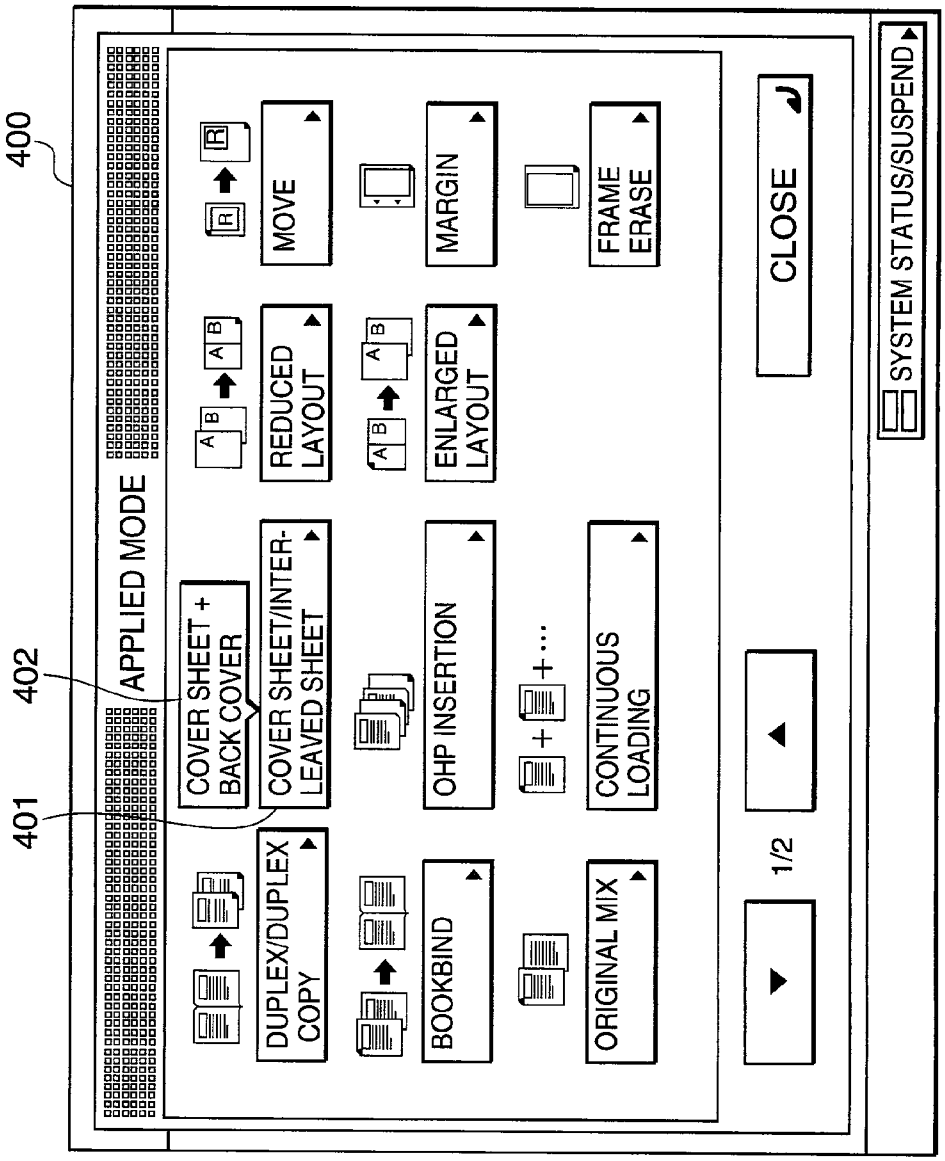
FIG. 13 is a view illustrating an applied mode screen displayed in the operating section 210 in FIG. 2.

FIG. 13 is a view illustrating an applied mode screen displayed in the operating section 210 in FIG. 2.

The applied mode screen 400 is displayed when the applied mode button 301 is depressed in the copy basic screen 300. A cover sheet/interleaved sheet button 401 is used to add (set) a cover sheet (separate sheet) to printing sheets on which images have been formed or insert (set) interleaved sheets (separate sheets) between the printing sheets. A banner 402 shown as "cover+back cover" is displayed when the cover sheet/interleaved sheet button 401 is depressed. The banner 402 displays some of the settings in a cover sheet/interleaved sheet selection screen 600, shown in FIG. 15. In this case, the "cover+back cover" banner shows that it is set such that a cover sheet and a back cover sheet (separate sheets) are added to (set on) printing sheets on which images have been formed.

Figure 14:
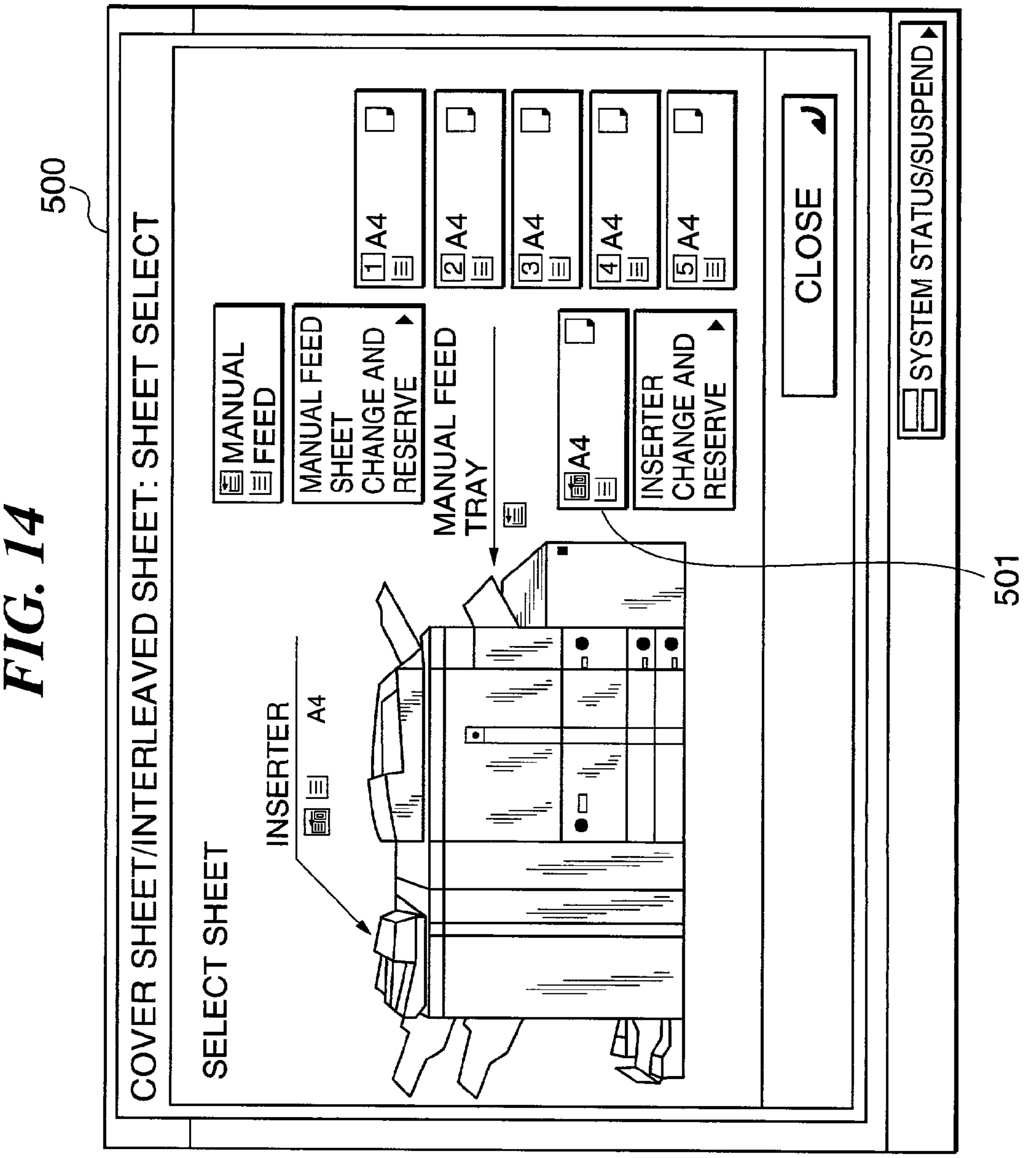
FIG. 14 is a view illustrating a feeding stage selecting screen displayed in the operating section 210 in FIG. 2.

FIG. 14 is a view illustrating a sheet feeding stage selection screen displayed in the operating section in FIG. 2.

The cover sheet/interleaved sheet sheet selection screen 500 in FIG. 14 is displayed when any of a sheet selection button 602, a back cover sheet selection button 603, and an interleaved sheet and chapter sheet selection button 604 is depressed. In addition to sheet feeding from the sheet feeding section 122 of the printer, the user can select sheet feeding from the inserter unit 126 (see FIG. 4) via the screen in FIG. 14. For example, if sheets such as cover sheets or back cover sheets are fed from the inserter unit 126, they are fed into the finisher without passing through the printer section. Accordingly, sheets with an image or images for the cover sheet and/or back cover sheet printed thereon are set in the inserter unit 126. In this case, it is assumed that the user depresses an inserter sheet feeding selection button 501 to select sheet feeding from the inserter unit 126.

Figure 15:
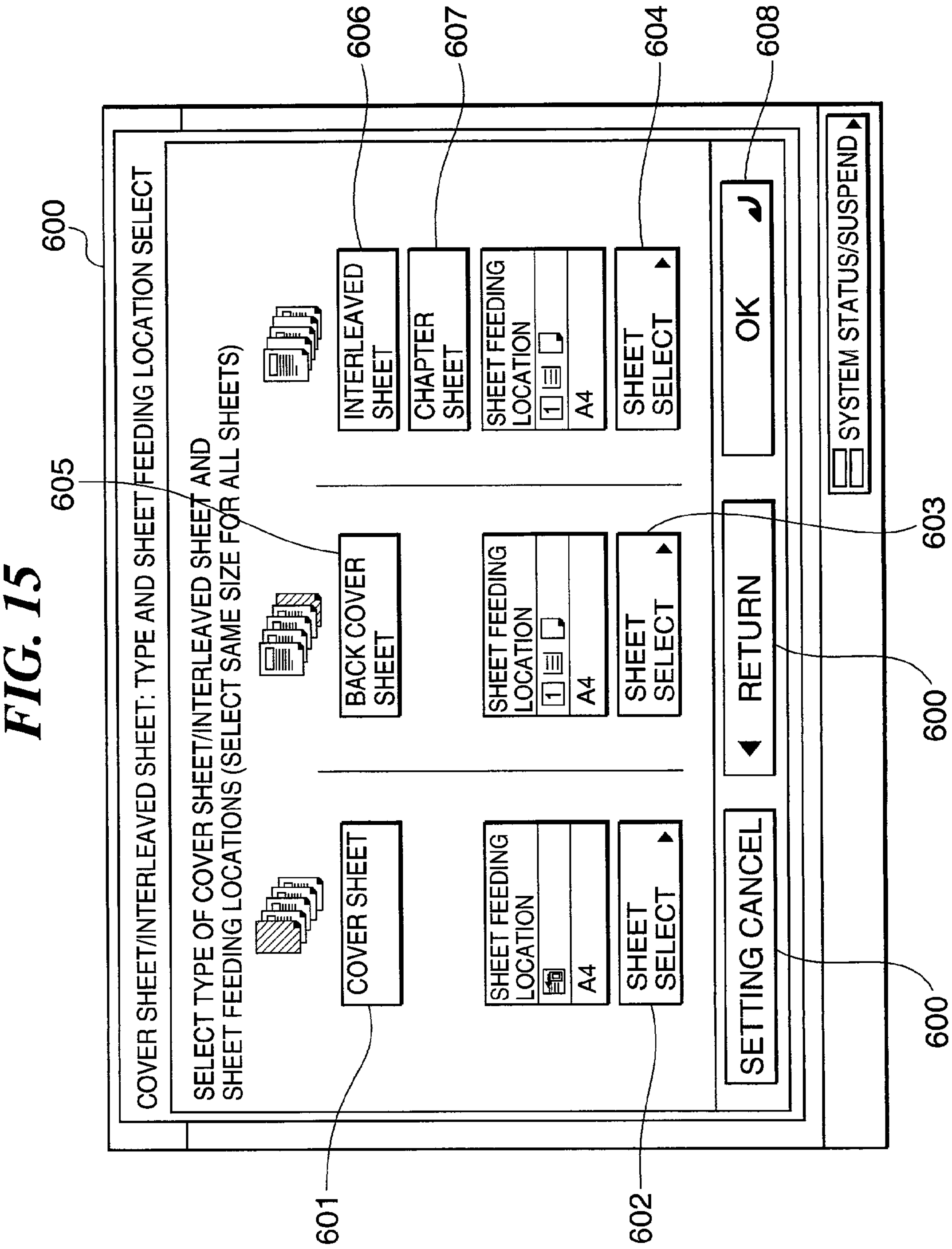
FIG. 15 is a view showing an example of a cover sheet/interleaved sheet setting screen displayed in the operating section 210 in FIG. 2.

FIG. 15 is a view showing an example of a cover sheet/interleaved sheet setting screen displayed in the operating section 210 in FIG. 2.

The cover sheet/interleaved sheet setting screen 600 is used to select the type of the cover sheet/interleaved sheet and sheet feeding sections, and is displayed when the cover sheet/interleaved sheet button 401 is depressed. When the cover sheet, back cover sheet, interleaved sheet, or chapter sheet (separate sheet) is used, a cover sheet button 601, back cover sheet button 605, interleaved sheet button 606, or chapter sheet button 607 is depressed, respectively. When the user depresses these buttons, the respective sheet feeding stages can be selected. When the cover sheet button 601 and then a cover sheet selection button 602 are depressed, a sheet feeding section selection screen, not shown, is displayed, so that a cover sheet feeding stage can be selected as a desired one of a plurality of candidates including the sheet feeding section 122 of the printer section and the inserter unit 126. When the back cover sheet button 605 and then a back cover sheet selection button 603 are depressed, a sheet feeding section selection screen, not shown, is displayed, so that a back cover sheet feeding stage can be selected as a desired one of a plurality of candidates including the sheet feeding section 122 of the printer section and the inserter unit 126. When the interleaved sheet button 606 and then an interleaved sheet and chapter sheet sheet selection button 604 are depressed, a sheet feeding section selection screen, not shown, is displayed, so that an interleaved sheet feeding stage can be selected as a desired one of a plurality of candidates including the sheet feeding section 122 of the printer section and the inserter unit 126. After these selections, when an OK button 608 is depressed, the setting is completed.

Figure 16:
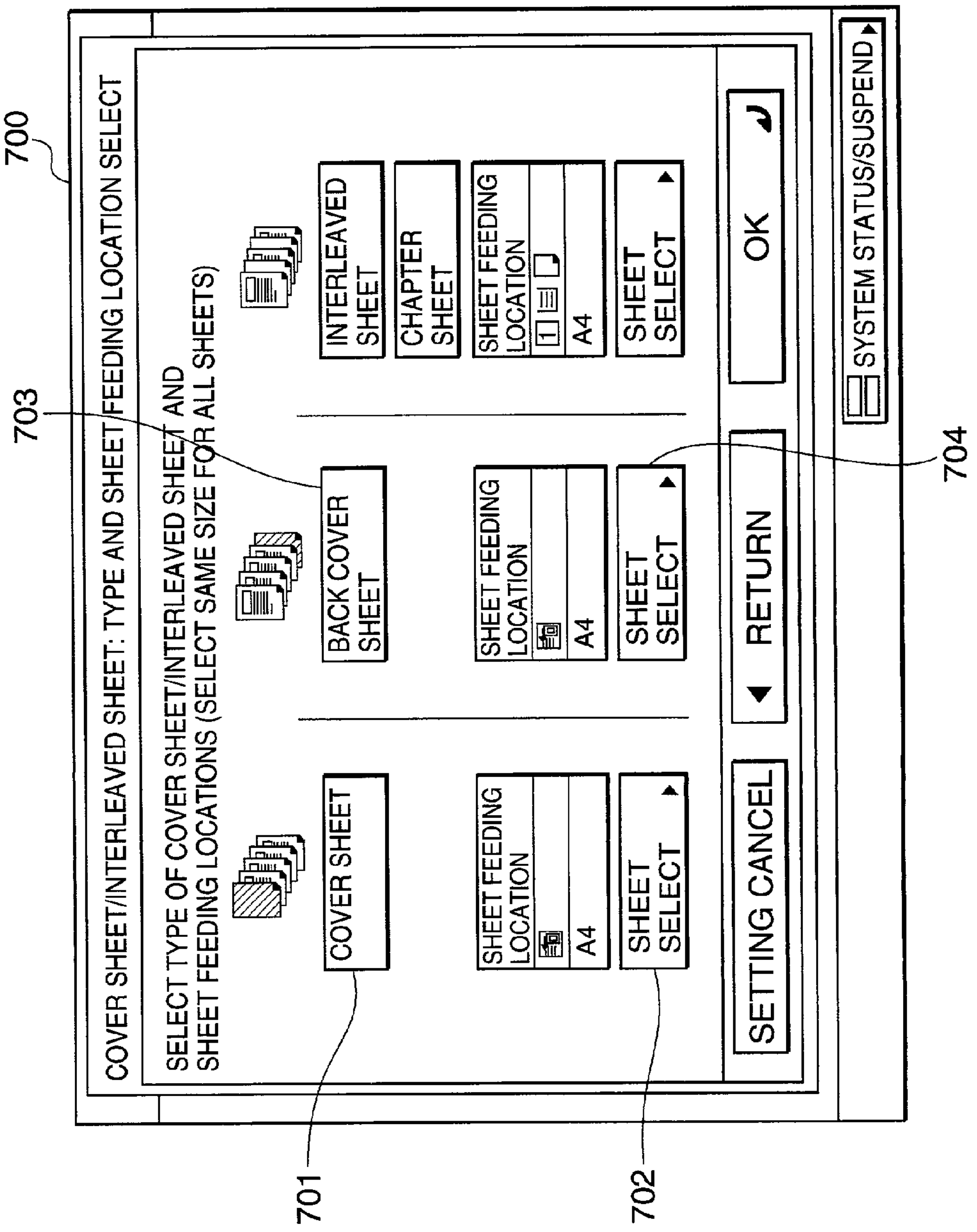
FIG. 16 is a view showing another example of the cover sheet/interleaved sheet setting screen displayed in the operating section 210 in FIG. 2.

FIG. 16 is a view showing another example of the cover sheet/interleaved sheet setting screen displayed in the operating section in FIG. 2.

In the cover sheet/interleaved sheet setting screen 700, a cover sheet button 701 and a back cover sheet button 703 have been depressed. Furthermore, the inserter unit 126 has been selected as a sheet feeding stage for both the cover sheet and back cover sheet by operating a cover sheet selection button 702 and a back cover sheet selection button 704. Thus, in this embodiment, if the user makes the settings shown in the example in FIG. 15, a single sheet from the inserter can be inserted into a bundle of sheets as an output result. On the other hand, if the user makes the settings shown in the example in FIG. 16, then a plurality of sheets, for example, a cover sheet and a back cover sheet can be inserted into a bundle of sheets. Any of these operations can be selected by the user. In this respect, information set by the user via any of the setting screens in FIGS. 14, 15, and 16 is managed by the controller 200 for each job in a table form such as one shown in FIG. 21, described later. Based on the set information, the controller 200 controls the operation of various units such as the scanner 100, printer section 120, finisher 124, and inserter unit 126.

Figure 17:
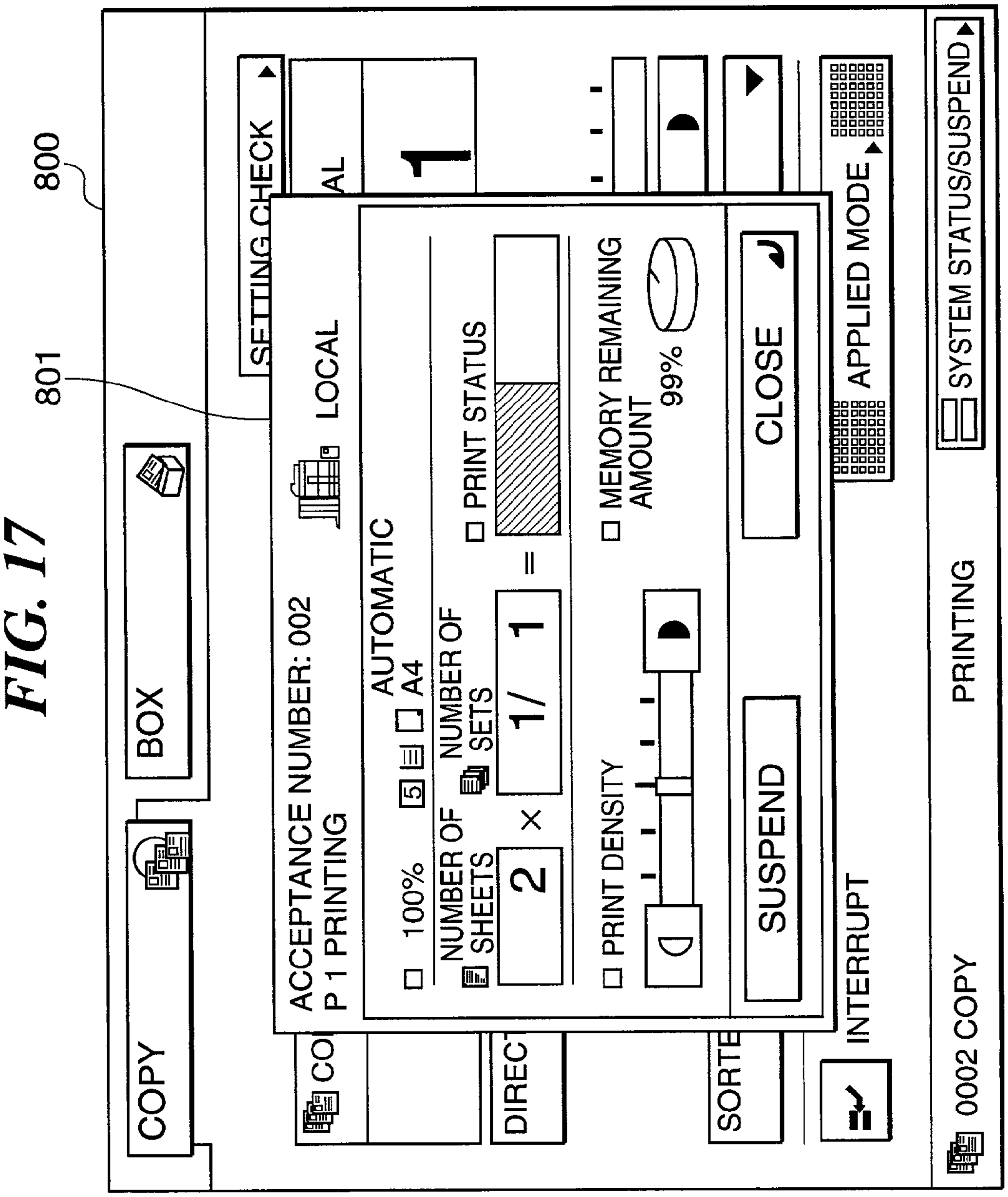
FIG. 17 is a view illustrating a copy executing screen displayed in the operating section 210 in FIG. 2 during copying.

FIG. 17 is a view illustrating a copy execution screen displayed in the operating section 210 in FIG. 2, during copying.

When various output job settings are completed via the setting screens such as in FIGS. 14 to 16 and then the user depresses a start key, not shown, in the operating section 210, a copy job is started to start loading originals, and the copy execution screen 800 is displayed. The screen displayed on the copy execution screen 800 is a copy dialog 801 that shows how the copy job is going.

Figure 18:
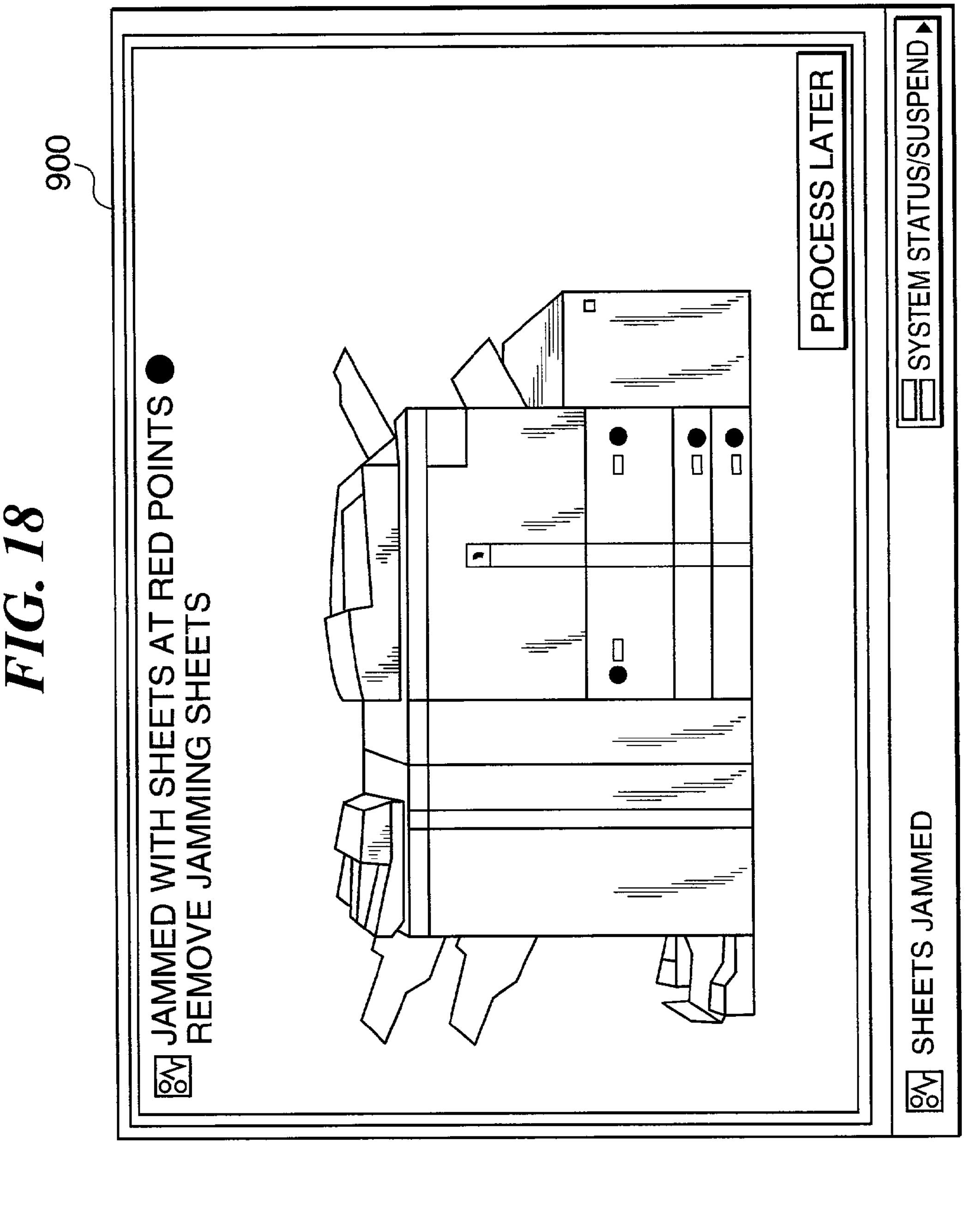
FIG. 18 is a view illustrating a jam screen displayed in the operating screen 210 in FIG. 2.

FIG. 18 is a view illustrating a jam screen displayed in the operating section 210 in FIG. 2.

The jam screen 900 is displayed when a jam occurs while a copy job is being executed.

Figure 19:
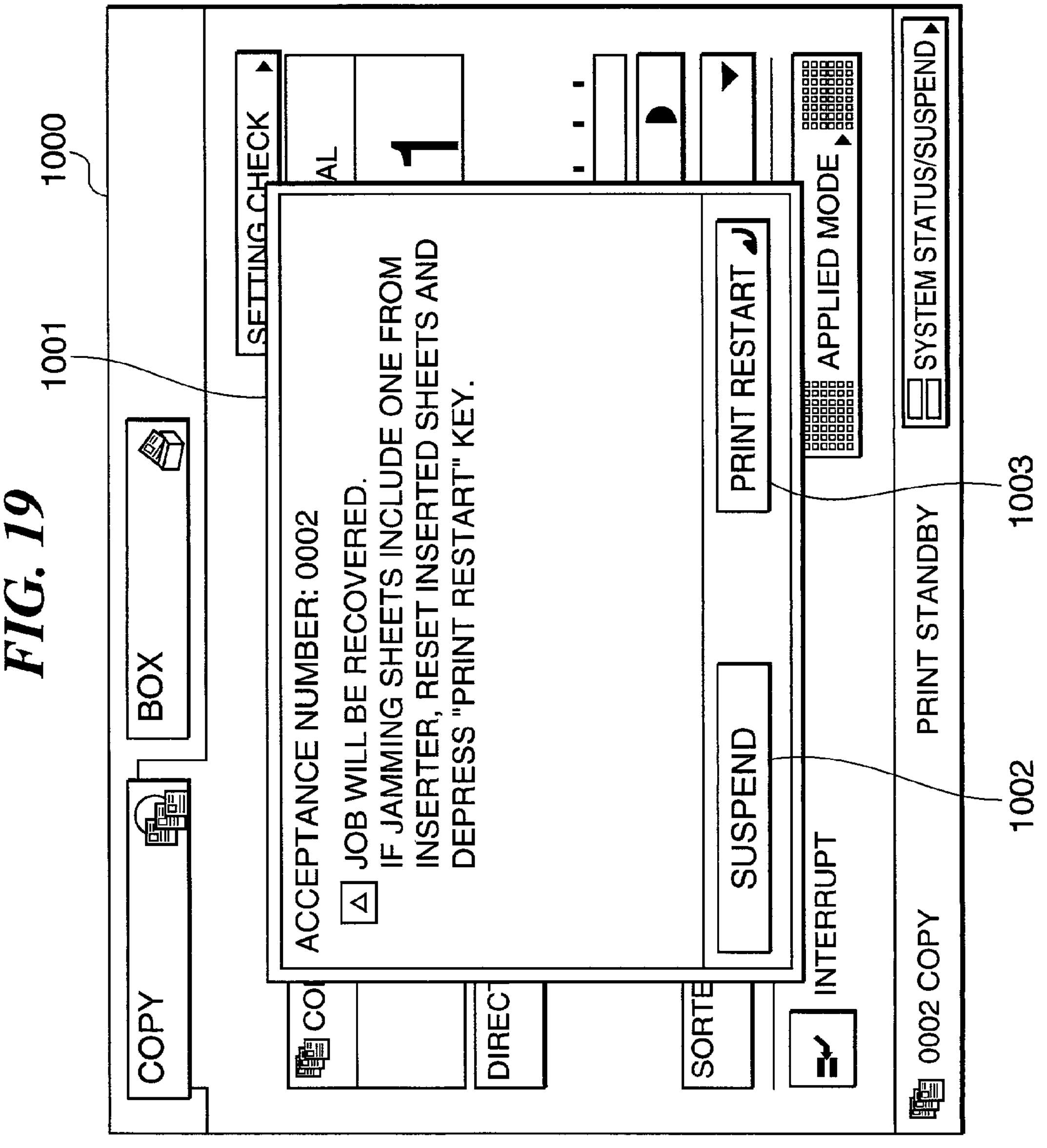
FIG. 19 is a view illustrating a recovery screen displayed in the operating screen 210 in FIG. 2.

FIG. 19 is a view illustrating a recovery screen displayed in the operating section 210 in FIG. 2 after the occurrence of a jam was notified to the user using the screen in FIG. 18 and then the user has detected that the jam had been eliminated.

The recovery screen 1000 can be displayed if a jam occurs while sheets are being fed from the inserter unit 126. A recovery instruction dialog 1001 then appears and displays an instruction to the user. A print restart button 1003 is depressed to restart the job during execution of which a jam has occurred. That is, the user manually instructs jam recovery to be executed.

Next, the details of processing executed when a jam occurs will be described with reference to FIGS. 20 and 21.

Figure 20:
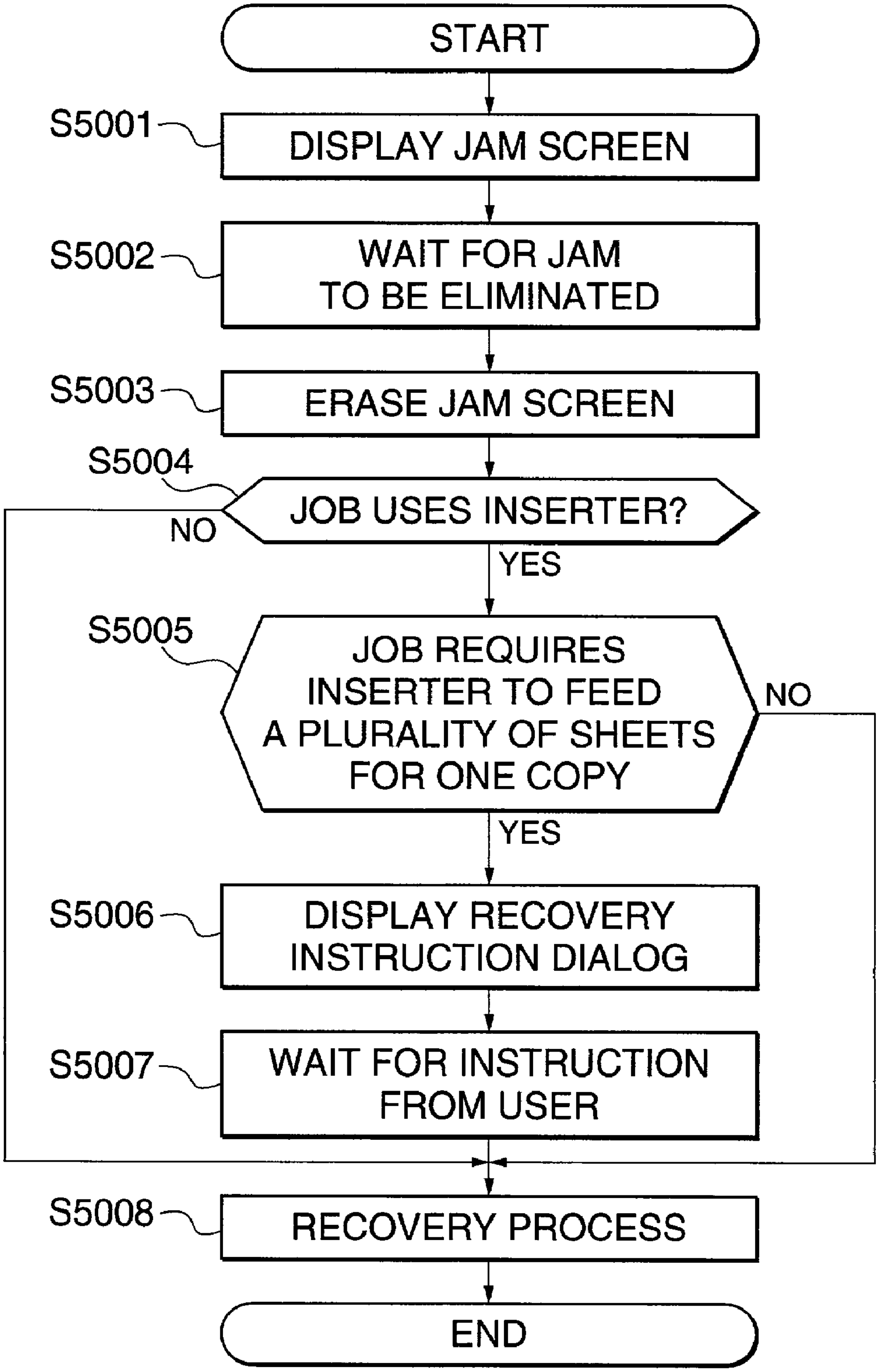
FIG. 20 is a flow chart showing a process executed when a jam occurs.

FIG. 20 is a flow chart showing a process executed when a jam occurs. A program that executes this process is stored in a memory such as the ROM 203 and is read out and executed by the image controller 200.

FIG. 21 is a view illustrating a sheet feeding management table.

The sheet feeding management table 1100 is provided for each job and has stored therein specification setting information concerning the sheet feeding stage being used in execution of the job. In this example, a text 1101, a cover sheet 1102, a back cover sheet 1103, and an interleaved sheet 1104 are associated with sections 1105, 1106, 1107, and 1108. According to this example, N jobs, that is, a job 1, a job 2, , , , a job N are registered as jobs to be output. Sheet feeding management information for the job 1, job 2, and job 3 is denoted by 1100-1, 1100-2, and 1100-3, respectively.

As regards the sheet feeding information for the job 1, the sheet feeding stage for the text 1101-1 is an automatic sheet feeding stage, the sheet feeding stage for a cover sheet 1102-1 is the inserter unit, and the sheet feeding stage for a back cover sheet 1103-1 is a cassette 1 installed in the printer section. Further, the sheet feeding stage for an interleaved sheet 1104-1 is represented as "none" because no interleaved sheet is used. That is, the job 1 causes the inserter to feed a single sheet.

As regards the sheet feeding information for the job 2, the sheet feeding stage for the text 1101-2 is the cassette 1 installed in the printer section (this means that images read from text originals using the scanner are printed on sheets from the cassette 1), the sheet feeding stage for a cover sheet 1102-2 is the inserter unit (this means that a sheet set in the inserter unit 126 is used as a cover sheet), the sheet feeding stage for a back cover sheet 1103-2 is also the inserter unit (this means that a sheet set in the inserter unit 126 is used as a back cover sheet), and the sheet feeding stage for an interleaved sheet 1104-1 is a cassette 2 installed in the printer section (a sheet in the cassette 2 is used as an insert). That is, the job 2 causes the inserter to feed a plurality of sheets (that is, two sheets of the cover sheet and the back cover sheet).

As regards the sheet feeding information for the job N, the sheet feeding stage for the text 1101-N is the cassette 1 installed in the printer section, the sheet feeding stage for a cover sheet 1102-N is represented as "none" (no cover sheet is used), the sheet feeding stage for a back cover sheet 1103-N is also represented as "none" (no back cover sheet is used), and the sheet feeding stage for an interleaved sheet 1104-N is also represented as "none" (no interleaved sheet is used). That is, the job N inhibits the inserter from feeding sheets (the inserter is not used).

When a jam occurs during a job, then in a step S5001, the jam screen 900 is displayed in the operating screen 210 to notify the user of the jam and urge him to remove the jamming paper. Thereafter, the user waits until the jamming paper is removed to eliminate the jam (step S5002). Whether or not the jam has been eliminated (the jamming sheet has been removed) is determined based on results of detection of the presence of sheets executed by sensors installed in sheet conveyance passages inside the image forming apparatus main body and the finisher. Once the jam has been eliminated, the jam screen 900 disappears (step S5003), and the copy execution screen 800 is displayed in the operating screen 210.

Next, the use of the sheet feeding stage in the job is determined (step S5004). That is, based on the sheet feeding management table 1100 shown in FIG. 21, it is determined whether or not the job uses the inserter unit 126 as a sheet feeding stage. It is determined that the job uses the inserter unit 126 if the inserter unit 126 is designated in any of the sections 1105, 1106, 1107, and 1108 of the sheet feeding management table 1100. If the job uses the inserter unit 126, the process proceeds to the next step S5005. This will be explained by referring to the example in FIG. 21. The jobs 1 and 2 in FIG. 21 correspond to the use of the inserter unit 126. Accordingly, if a jam occurs during execution of either job 1 or 2, the process proceeds to the step S5005. On the other hand, the job N does not use the inserter unit 126. Consequently, if a jam occurs during execution of the job N, the process proceeds to a step S5008.

In the step S5005, it is determined whether or not the job requires a plurality of sheets to be fed from the inserter unit 126 for a bundle for one copy. If a plurality of sheets are to be fed from the inserter unit 126, that is, for example, if the inserter unit 126 is designated in two or more of the sections 1105, 1108, 1107, and 1108 as in the example of settings shown in FIG. 16, then the recovery instruction dialog 1001, shown in FIG. 19, is displayed to urge the user to check sheets from the inserter again (step S5006). This will be explained by referring to the example in FIG. 21. In the job 1 in FIG. 21, the inserter unit 126 feeds only one sheet. That is, with this job, the inserter unit 126 need not feed a plurality of sheets for a bundle for one copy. Consequently, if a jam occurs during the job 1, the process proceeds to the step S5008. On the other hand, in the case of the job 2 in FIG. 21, the inserter unit 126 feeds two sheets. That is, the job requires the inserter unit 126 to feed a plurality of sheets for a bundle for one copy. Consequently, if a jam occurs during execution of the job 2, the process proceeds to the step S5006.

Next, the system waits for an instruction from the user (step S5007). When the print restart button 1003 (FIG. 19) is depressed, a jam recovery process is executed to restart the interrupted job, and the entire process is then completed (step S5008). In the recovery operation in the step S5008, for example, if a bundle of originals comprised of five pages are printed starting with a first page and if the sheet on which the third page of the originals is being printed has jammed, then the process is restarted from the third page of the originals. At which page the sheet has jammed is determined based on setting information input through the operating section by the user, information from a counter installed in the sheet discharging section of the image forming apparatus to count the number of discharged sheets (count the number of sheets for which outputs have been completed), or the like. On the other hand, for example, in a bookbinding process in a pamphlet mode or the like, the input order of images is different from the output order thereof in which the images are actually printed on sheets (the order of the pages is changed during printing). Accordingly, if a jam occurs while such an image forming operation is being carried out, the recovery operation is carried out by restarting the process, for example, from the first page. If a plurality of copies are output, the process is restarted from the beginning of one of the copies. On the other hand, for example, if a jam occurs during an image forming operation in which sheets from the inserter unit 126 are inserted between the text originals during execution of a job and any sheet from the inserter unit 126 has then jammed, then the recovery operation restarts the process, for example, from an operation of causing the inserter unit 126 to feed sheets. Whether or not any sheet from the inserter unit 126 has jammed is determined based on setting information input by the user via the operation screens in FIGS. 14, 15, 16, information from a sensor installed on a path along which sheets from the inserter unit 126 are conveyed, or the like. Any of these processes is executed in the step S5008 as a recovery process.

If the result of the determination in the step S5004 shows that the job does not use the inserter unit 126, the process proceeds to the step S5008 by skipping the above described steps S5005 to S5007, and is then completed. If the job does not use the inserter unit 126, the inserter unit 126 is not designated in any of the sections 1105, 1106, 1107, and 1108 of the sheet feeding management table 1100. For example, in the example in FIG. 21, this case corresponds to the job N.

If the result of the determination in the step S5005 shows that the inserter unit 126 does not feed a plurality of sheets, that is, for example, if the inserter unit 126 is designated in only one of the sections 1105, 1106, 1107, and 1108 as in the example of settings shown in FIG. 15, then the process proceeds to the step S5008 and is thus completed. For example, in the example in FIG. 21, this case corresponds to the job 2.

In the process of FIG. 20 described above, the jam screen 900 is displayed in the operating screen 210 to notify the user that a jam has occurred and urge him to remove the jamming sheet (step S5001). Once the jam has been eliminated, if it is determined based on the sheet feeding management table 1100 that the job uses the inserter unit 126

(YES in the step S5004) and at the same time the job requires the inserter unit 126 to feed a plurality of sheets for a bundle for one copy (YES in the step S5005), then the recovery instruction dialog 1001 is displayed in order to urge the user to check sheets from the inserter (step S5006). In response to an instruction from the user, the interrupted job is restarted, and then the process is completed (step S5008). Thus, before the job is restarted after the jam recovery process, the user can ascertain the sheets to be fed after the restart of the job, resulting in reliable and correct sheet feeding.

Thus, in the present embodiment, when the recovery operation is to be performed on the job for which the image forming operation has been interrupted due to a sheet jam or the like, if the job for which the process has been interrupted uses the inserter unit 126 and requires the inserter unit 126 to feed two or more sheets, then the display as shown in FIG. 19 is provided in the operating section, to notify the user that the inserter unit 126 should be checked. Then, control is provided to resume the recovery operation in response to the depression by the user of the restart button 1003 in the screen 1001 in FIG. 19. That is, control is provided such that the recovery operation is inhibited from being automatically executed and is instead started in response to an instruction from the user (the mode in which the recovery operation is started in response to an instruction from the user). On the other hand, if the interrupted job does not use the inserter unit 126 or requires the inserter unit 126 to feed only one sheet, the notification as shown in FIG. 19 is not given to the user, and control is provided to automatically execute the recovery process. That is, control is provided such that the notification process for the user is inhibited and the recovery operation is automatically started (the mode in which the recovery operation is started without any instruction from the user).

In the above described embodiment, control is switched depending on whether the inserter unit 126 feeds one sheet or a plurality of sheets. This takes into consideration various conditions such as those described below. For example, if a plurality of copies are printed and the inserter unit 126 feeds two sheets, that is, a cover sheet and a back cover sheet while a bundle of sheets for one copy are being printed, a number of cover sheets and back cover sheets corresponding to the plurality of copies are alternately set into the inserter. In this situation, for example, if the recovery operation automatically restarts the process from the sheet feeding operation by the inserter unit 126, the insertion order of inserted sheets may become incorrect, for example, a sheet for the back cover sheet may be inserted in a position in which the cover sheet is to be inserted, or other inconveniences may occur. Thus, the present embodiment provides such control that if the interrupted job requires the inserter unit 126 to feed a plurality of sheets for a bundle for one copy, the recovery operation is not automatically carried out but carried out in response to an instruction from the user. On the other hand, if the job requires the inserter unit 126 to feed only one sheet for a bundle for one copy, the recovery operation is started without any instruction from the user because the above described inconvenience does not occur.

Further, in the above described embodiment, the recovery method is switched between the case where the inserter unit 126 feeds one sheet for a bundle for one copy and the case where the inserter unit 126 feeds a plurality of sheets for a bundle for one copy. The present invention is applicable to the following arrangements in order to simplify the process of determining whether the interrupted job requires the inserter unit 126 to feed one sheet or a plurality of sheets (the processing in the step S5005), or other processes:

For example, when the interrupted job is to be recovered, control is provided such that if the job uses the inserter unit 126, a display as shown in FIG. 19 is provided in the operating section regardless of the number of sheets from the inserter, to urge the user to check the inserter unit 126. Control is further provided such that the recovery operation is carried out in response to the depression by the user of the print restart button 1003 in the screen 1001 in FIG. 19 (that is, the system is brought into the mode in which the recovery operation is started in response to an instruction from the user). For example, in the example in FIG. 21, this corresponds to the job 1 and job 2. On the other hand, control is provided such that when the interrupted job does not use the inserter unit 126, the recovery process is automatically executed without giving the user a notification such as one shown in FIG. 19 (the system is brought into the mode in which the recovery operation is started without any instruction from the user). In the example in FIG. 21, this corresponds to the job N. A flow chart showing how to execute the process of this embodiment may be arranged so that if the result of the determination in the step S5004 in the flow chart in FIG. 20 is affirmative, the process proceeds to the step S5006 and subsequent steps, whereas if the result of the determination is negative, the process proceeds to the step S5008. This simplifies the construction of the apparatus while preventing the above described inconvenience.

Figure 22A:
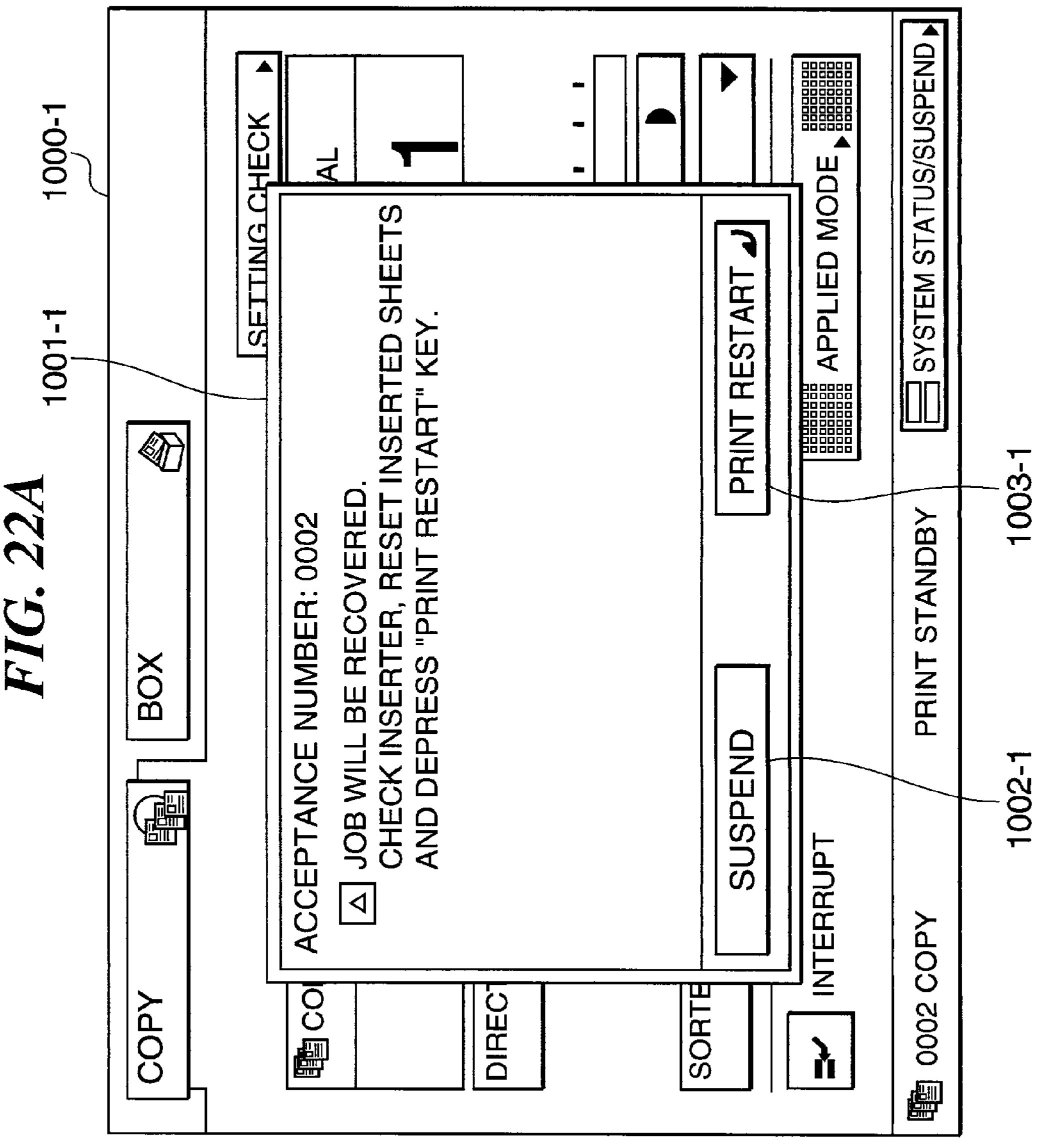
FIGS. 22A and 22B are views showing displays provided when a job is interrupted, depending on the type of the interrupted job.
Figure 22B:
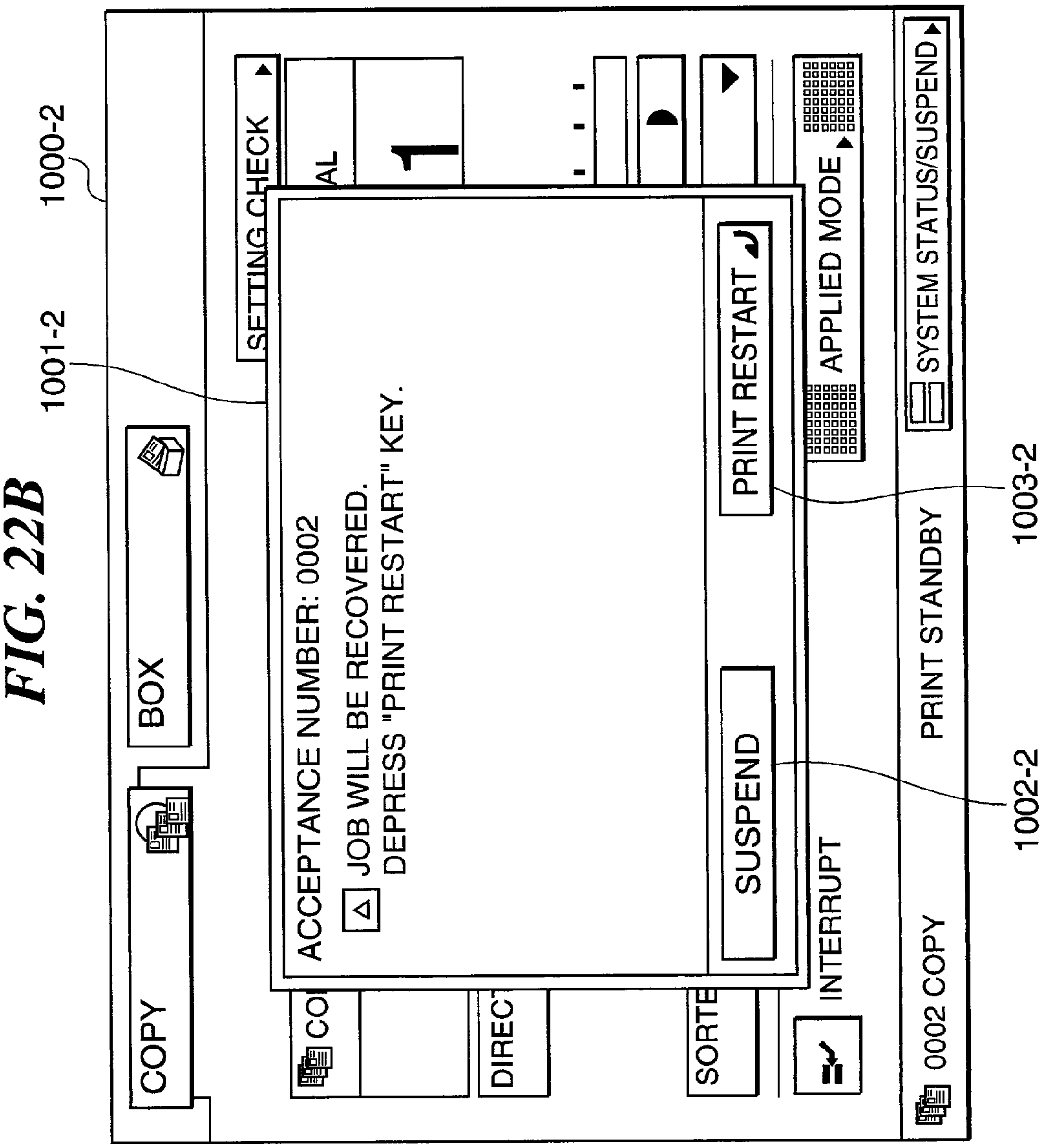

Alternatively, control may be provided such that whatever job is interrupted, the user is notified of the interruption without the recovery process being automatically executed. But, in this case as well, the contents of the notification varies depending on the type of the interrupted job. For example, if the interrupted job uses the inserter unit 126 (in the example in FIG. 21, the job 1 or job 2), a display as shown in FIG. 22A is provided. On the other hand, control is provided such that if the job does not the inserter unit 126 (in the example in FIG. 21, the job N), a display as shown in FIG. 22B is provided.

Alternatively, if the interrupted job uses the inserter unit 126 and requires the inserter unit 126 to feed two or more sheets (in the example in FIG. 21, the job 2), a display as shown in FIG. 22A is provided. On the other hand, control may be provided such that if the job does not use the inserter unit 126 or requires the inserter unit 126 to feed only one sheet (in the example in FIG. 21, the job 1 or job N), a display as shown in FIG. 22B is provided.

Further, in the above described embodiment, the recovery operation is carried out when a sheet jam occurs. However, the present invention is applicable to a recovery operation carried out when the job is interrupted due to an original jam in the original feeder or a staple jam in a staple unit (not shown). In any case, the job is interrupted based on information from various sensors installed inside the apparatus, and then control is provided such that the above described recovery operation is carried out when it is ascertained that the user has eliminated the cause of the job interruption.

The present invention is also applicable to processing of data input from an external apparatus via the LAN 10 or WAN 20 in FIG. 2. In this case, for example, a personal computer to be used is constructed so as to display the various operation screens shown in FIGS. 13 to 19 and 22 so that the user is instructed to make settings for the inserter unit 126 via the screens in FIGS. 14 to 16 and other figures on the computer. The resulting setting information is then transmitted to the printer together with image data, and the printer then carries out a printing process. Then, if a jam occurs, the printer transmits corresponding information to the personal computer to cause it to provide the display in FIG. 18. Once the user eliminates the jam, the display in FIG. 19 or 22 is provided on the personal computer depending on the type of interrupted job, as in the above described embodiments. Then, control is provided such that the printer restarts the process in response to depression of the button 1003.

In the above description, the process is executed by the image controller, but it may be executed by a control section, not shown, of the image forming apparatus.

Further, an arbitrary storage medium having the above processing method stored therein may supply a control section of an image controller or an image forming apparatus with a program that executes the processing method so that either a CPU of the image controller or an MPU thereof, not shown, can execute this program. Alternatively, the above storage medium may supply the above program to the control section of the image forming apparatus so that either a CPU or MPU, not shown, of the image forming apparatus can execute the program. The storage medium may be selected from, for example, a RAM, NV-RAM, a floppy (registered trade mark) disk, hard disk, optical disk, magneto-optical disk, CD-ROM, MO, CD-RW, DVD (DVD-ROM, DVD-R), magnetic tape, non-volatile memory, and ROM.

Further, instead of either the CPU or MPU of the image controller, a circuit, not shown, having similar operations to the CPU or MPU may implement the above described embodiment. Alternatively, instead of either the CPU or MPU of the image forming apparatus, a circuit, not shown, having similar operations to the CPU or MPU may implement the above described embodiment.

Moreover, the program supplied by the storage medium may be written into a memory, not shown, provided in an expanded board, not shown, inserted in an image controller, or an expanded unit, not shown, connected to an image control apparatus, and a CPU, not shown, or the like provided in the expanded board or expanded unit may then perform a part or all of the program. Alternatively, the program supplied by the storage medium may be written into a memory, not shown, provided in an expanded board, not shown, inserted in an image forming apparatus, or an expanded unit, not shown, connected to an image forming apparatus, and a CPU, not shown, or the like provided in the expanded board or expanded unit may then perform a part or all of the program.

What is claimed is:

1. An image forming system enabling discharge of sheets on which images have been formed by an image forming unit and at least one type of insert sheets as sheets required in a single job, said image forming system comprising:

a setting unit adapted to selectively enable execution of a first setting which inserts only one type of insert sheets in a single job, and execution of a second setting which inserts a plurality of types of insert sheets in a single job; and a controller adapted to cause a display unit to execute at least one of a first display that notifies an occurrence of jam without displaying any recovery dialog that notifies an operator to check insert sheets and any manual prompt for continuing with recovery operation or a second display that displays a recovery dialog that at least notifies an operator to check insert sheets and that provides at least one manual prompt for continuing with recovery operation, in a case where a jam has occurred, wherein said controller causes said display unit to execute said first display without executing the second display, in a case where a jam has occurred in a single job in which said first setting is executed by said setting unit, and wherein said controller causes said display unit to execute both of said first display and said second display, in a case where a jam has occurred in a single job in which said second setting is executed by said setting unit.

2. An image forming system according to claim 1, wherein said setting unit enables execution of a setting which inserts only a cover sheet in the single job as said first setting, and execution of a setting which inserts the cover sheet and a back cover sheet in the single job as said second setting.

3. An image forming system according to claim 1, wherein the insert sheets are insertable into the sheets on which images have been formed by said image forming unit by being fed from a predetermined sheet feeding unit provided in said image forming system, without being fed through said image forming unit.

4. An image forming system according to claim 1, wherein:

said image forming unit is for forming images on the sheets, based on data input through an original reading unit provided in said image forming system, execution of said first setting and execution of said second setting being selectively enabled via an operating unit provided in said image forming system, said display unit included in said operating unit is caused to execute said first display and said second display, in the case where the jam has occurred in the single job in which said second setting is executed, and said display unit included in said operating unit is caused to execute said first display without executing said second display, in the case where the jam has occurred in the single job in which said first setting is executed.

5. An image forming system according to claim 1, wherein:

said image forming unit provided in said image forming system is for forming images on the sheets, based on data from an external apparatus which is communicable with said image forming system, execution of said first setting and execution of said second setting are selectively enabled via another display unit provided in said external apparatus, in a case where the data from said external apparatus is processed, and execution of said first display is enabled by said another display unit provided in said external apparatus, in a case where the data from said external apparatus which is communicable with said image forming system is processed, and a jam has occurred.

6. An image forming system according to claim 1, wherein said controller causes a sheet processing unit provided in said image forming system to post-process the sheets on which images have been formed by said image forming unit and the insert sheets fed from a feed inserter without being fed via said image forming unit, as the single job.

7. A controlling method of an image forming system enabling discharge of sheets on which images have been formed by an image forming unit and at least one type of insert sheets as sheets required in a single job, comprising the steps of:

enabling selectively execution of a first setting which inserts only one type of insert sheets in a single job, and execution of a second setting which inserts a plurality of types of insert sheets in a single job, via a setting unit;

causing a display unit to execute both of a first display that notifies an occurrence of jam without displaying any recovery dialog that notifies an operator to check insert sheets and any manual prompt for continuing with recovery operation and a second display that displays a recovery dialog that at least notifies a checking of insert sheets and that provides at least one manual prompt for continuing with recovery operation, in a case where a jam has occurred in a single job in which said second setting is executed by said setting unit; and causing said display unit to execute said first display without executing said second display, in a case where a jam has occurred in a single job in which said first setting is executed by said setting unit.

8. A controlling method of an image forming system according to claim 7, wherein execution of a setting which inserts only a cover sheet in the single job as said first setting is enabled via said setting unit, and execution of a setting which inserts the cover sheet and a back cover sheet in the single job as said second setting is enabled via said setting unit.

9. A controlling method of an image forming system according to claim 7, wherein the insert sheets are insertable into the sheets on which images have been formed by said image forming unit by being fed from a predetermined sheet feeding unit provided in said image forming system, without being fed through said image forming unit.

10. A controlling method of an image forming system according to claim 7, wherein:

images are formable on the sheets by said image forming unit, based on data input through an original reading unit provided in said image forming system, execution of said first setting and execution of said second setting are selectively enabled via an operating unit provided in said image forming system, said display unit included in said operating unit is caused to execute said first display and said second display, in the case where the jam has occurred in the single job in which said second setting is executed, and said display unit included in said operating unit is caused to execute said first display without executing said second display, in the case where the jam has occurred in the single job in which said first setting is executed.

11. A controlling method of an image forming system according to claim 7, wherein:

images are formable on the sheets by said image forming unit, based on data from an external apparatus which is communicable with said image forming system, execution of said first setting and execution of said second setting are selectively enabled via another display unit provided in said external apparatus, in a case where the data from said external apparatus is processed, and execution of said first display is enabled by said another display unit provided in said external apparatus, in a case where the data from said external apparatus which is communicable with said image forming system is processed, and a jam has occurred.

12. A controlling method of an image forming system according to claim 7, wherein a sheet processing unit provided in said image forming system is caused to post-process the sheets on which images have been formed by said image forming unit and the insert sheets fed from a feed inserter without being fed via said image forming unit, as the single job.

13. A computer-readable storage medium storing a program for causing an image forming system to execute a controlling method thereof enabling discharge of sheets on which images have been formed by an image forming unit and at least one type of insert sheets as sheets required in a single job, said control method comprising the steps of:

enabling selectively execution of a first setting which inserts only one type of insert sheets in a single job, and execution of a second setting which inserts a plurality of types of insert sheets in a single job, via a setting unit;

causing a display unit to execute both of a first display that notifies an occurrence of jam without displaying any recovery dialog that notifies an operator to check insert sheets and any manual prompt for continuing with recovery operation and a second display that displays a recovery dialog that at least notifies a checking of insert sheets and that provides at least one manual prompt for continuing with recovery operation, in a case where a jam has occurred in a single job in which said second setting is executed by said setting unit; and causing said display unit to execute said first display without executing said second display, in a case where a jam has occurred in a single job in which said first setting is executed by said setting unit.

14. A computer-readable storage medium according to claim 13, wherein execution of a setting which inserts only a cover sheet in the single job as said first setting is enabled via said setting unit, and execution of a setting which inserts the cover sheet and a back cover sheet in the single job as said second setting is enabled via said setting unit.

15. A computer-readable storage medium according to claim 13, wherein the insert sheets are insertable into the sheets on which images have been formed by said image forming unit by being fed from a predetermined sheet feeding unit provided in said image forming system, without being fed through said image forming unit.

16. A computer-readable storage medium according to claim 13, wherein:

images are formable on the sheets by said image forming unit, based on data input through an original reading unit provided in said image forming system, execution of said first setting and execution of said second setting are selectively enabled via an operating unit provided in said image forming system, said display unit included in said operating unit is caused to execute said first display and said second display, in the case where the jam has occurred in the single job in which said second setting is executed, and said display unit included in said operating unit is caused to execute said first display without executing said second display, in the case where the jam has occurred in the single job in which said first setting is executed.

17. A computer-readable storage medium according to claim 13, wherein:

images are formable on the sheets by said image forming unit, based on data from an external apparatus which is communicable with said image forming system, execution of said first setting and execution of said second setting are selectively enabled via another display unit provided in said external apparatus, in a case where the data from said external apparatus is processed, and execution of said first display is enabled by said another display unit provided in said external apparatus, in a case where the data from said external apparatus which is communicable with said image forming system is processed, and a jam has occurred.

18. A computer-readable storage medium according to claim 13, wherein a sheet processing unit provided in said image forming system is caused to post-process the sheets on which images have been formed by said image forming unit and the insert sheets fed from a feed inserter without being fed via said image forming unit, as the single job.

* * * * *